United States Patent
Matei et al.

(10) Patent No.: US 12,099,352 B2
(45) Date of Patent: Sep. 24, 2024

(54) METHODS AND SYSTEMS FOR FAULT DIAGNOSIS

(71) Applicant: Palo Alto Research Center Incorporated, Palo Alto, CA (US)

(72) Inventors: Ion Matei, Santa Cruz, CA (US); Aleksandar B. Feldman, Santa Cruz, CA (US); Alexandre Perez, San Mateo, CA (US); Johan de Kleer, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 469 days.

(21) Appl. No.: 17/484,671

(22) Filed: Sep. 24, 2021

(65) Prior Publication Data
US 2023/0104347 A1   Apr. 6, 2023

(51) Int. Cl.
*G05B 23/02* (2006.01)
*G06N 3/08* (2023.01)

(52) U.S. Cl.
CPC ..... *G05B 23/0262* (2013.01); *G05B 23/0254* (2013.01); *G05B 23/0275* (2013.01); *G06N 3/08* (2013.01)

(58) Field of Classification Search
CPC .............. G05B 23/0262; G05B 23/024; G05B 23/0254; G05B 23/0275; G05B 23/0286;
(Continued)

(56) References Cited

U.S. PATENT DOCUMENTS

| | | | |
|---|---|---|---|
| 8,024,610 B2 * | 9/2011 | de Kleer | G06F 11/2257 714/33 |
| 8,359,110 B2 * | 1/2013 | Kuhn | G05B 23/0245 700/47 |
| 8,473,785 B2 | 6/2013 | Liu et al. | |
| 8,959,006 B2 * | 2/2015 | Nasle | H04L 67/01 703/2 |

(Continued)

FOREIGN PATENT DOCUMENTS

| | | | | |
|---|---|---|---|---|
| CN | 103547746 B | * | 8/2016 | ............. E02F 9/226 |
| CN | 112183994 A | * | 1/2021 | ........... G06F 40/216 |
| CN | 113724804 A | * | 11/2021 | |
| CN | 113591379 B | * | 11/2023 | ............. G06F 30/27 |

OTHER PUBLICATIONS

J. De Kleer, et al. Characterizing Diagnoses, Conference Paper, Jan. 1990.

(Continued)

*Primary Examiner* — Jeffrey P Aiello
(74) *Attorney, Agent, or Firm* — Vorys, Sater, Seymour and Pease LLP

(57) ABSTRACT

Methods may comprise: identifying a fault indicator associated with a physical system; collecting first data related to a state of the physical system; applying a surrogate model to the first data to produce a plurality of potential fault modes; applying an optimization algorithm to the plurality of potential fault modes using a similarity metric to produce an input and a plurality of outputs, wherein each of the plurality of outputs corresponds to one of the plurality of potential fault modes, wherein the input provides differentiation between each of the plurality of outputs; applying the input to the physical system; collecting second data from physical system in response to applying the input; identifying a true mode of the physical system based on a comparison of the second data and the plurality of outputs; and diagnosing a fault of the physical system based on the true mode.

18 Claims, 16 Drawing Sheets

(58) Field of Classification Search
CPC ............ G05B 23/0283; G05B 23/0221; G05B 23/0229; G05B 2219/34477; G05B 19/41885; G06N 3/042; G06N 3/0442; G06N 3/08; G06N 3/09; G06N 3/047; G06N 3/045; G06N 3/02; G06N 7/01; G06N 7/02; G06N 20/00
USPC ........ 73/114.61; 700/108, 30, 109; 702/185, 702/183, 182, 58, 181, 188, 184, 179, 34, 702/117, 186, 35, 81, 104, 57, 59, 85; 703/2, 13; 706/12, 15, 52; 714/E11.157, 714/25, 737, 26, E11.024, 31, 48, 37, 714/741, E11.029
See application file for complete search history.

(56) References Cited

U.S. PATENT DOCUMENTS

2010/0306587 A1    12/2010    Liu et al.
2019/0383700 A1    12/2019    Matei et al.
2021/0081511 A1     3/2021    Matei et al.

OTHER PUBLICATIONS

A. Darwiche, Model-Based Diagnosis under Real-World Constraints, AI Magazine, 21:2 (2000).
R. Isermann, Model-Based Fault Detection and Diagnosis—Status and Applications, Ann. Rev. in Control, 29:1, 71-85 (2005).

* cited by examiner

METHODS AND SYSTEMS FOR FAULT DIAGNOSIS

STATEMENT REGARDING FEDERALLY SPONSORED RESEARCH AND DEVELOPMENT

None.

FIELD OF INVENTION

The present disclosure relates to methods and computing systems for diagnosing faults in physical systems.

BACKGROUND

Fault detection and diagnosis (or identification) in a physical system is important for safe and efficient operation of the system. When a fault occurs, timely identification is needed to be able to take timely corrective actions. However, many different faults may cause the physical system to respond or behave the same or in a similar manner. Complex systems where multiple faults may occur simultaneously may further complicate fault detection and diagnosis.

When a physical system (e.g., an electrical circuit, a chemical reactor, an engine, a power plant, a wind turbine, and the like) provides an indication that some aspect of the physical system is faulty, traditional approaches look at various sensor measurements and/or data from hardware redundancies to identify where the physical system has data that is outside specifications. Then, based on experience, an operator narrows down the possible faults until the fault is fixed or satisfactorily mitigated.

SUMMARY OF INVENTION

The present disclosure relates to methods and computing systems for diagnosing faults in physical systems.

The present disclosure includes methods for diagnosing a fault in a physical system, the methods comprising: identifying a fault indicator associated with the physical system; collecting first data related to a state of the physical system; applying a surrogate model to the first data to produce a plurality of potential fault modes; applying an optimization algorithm to the plurality of potential fault modes using a similarity metric to produce an input and a plurality of outputs, wherein each of the plurality of outputs corresponds to one of the plurality of potential fault modes, wherein the input provides differentiation between each of the plurality of outputs; applying the input to the physical system; collecting second data from physical system in response to applying the input; identifying a true mode of the physical system based on a comparison of the second data and the plurality of outputs; and diagnosing the fault of the physical system based on the true mode.

The present disclosure includes computing systems for diagnosing a fault in a physical system, the computing systems comprising: a processor; a memory coupled to the processor; and instructions provided to the memory, wherein the instructions are executable by the processor to cause the system to perform the method of any one of Clauses 1-10.

The present disclosure includes methods for diagnosing a fault in a system, the methods comprising: identifying a fault indicator associated with the physical system; collecting first data related to a state of the physical system; applying a surrogate model to the first data to produce a plurality of potential fault modes; applying an optimization algorithm to the plurality of potential fault modes using a similarity metric to produce a plurality of inputs and a plurality of outputs for each of the plurality of inputs, wherein each of the plurality of outputs for each of the plurality of inputs corresponds to one of the plurality of potential fault modes, wherein at least two of the plurality of inputs produce a different output for one of the plurality of potential fault modes; applying the plurality of inputs to the physical system; collecting second data from physical system in response to applying the plurality of inputs; identifying a true mode of the physical system based on a comparison of the second data and the plurality of outputs for each of the plurality of inputs; and diagnosing the fault of the physical system based on the true mode.

The present disclosure includes methods for generating a surrogate model, the methods comprising: applying a fault augmentation to a physics-based model of a physical system using physics-based fault modes to yield an augmented system model; generating training data by applying a plurality of inputs to the augmented system model; and training the surrogate model comprising differential equations with the training data.

The present disclosure includes systems comprising: a processor; a memory coupled to the processor; and instructions provided to the memory, wherein the instructions are executable by the processor to cause the system to perform any of the foregoing methods.

BRIEF DESCRIPTION OF THE DRAWINGS

The following figures are included to illustrate certain aspects of the disclosure and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
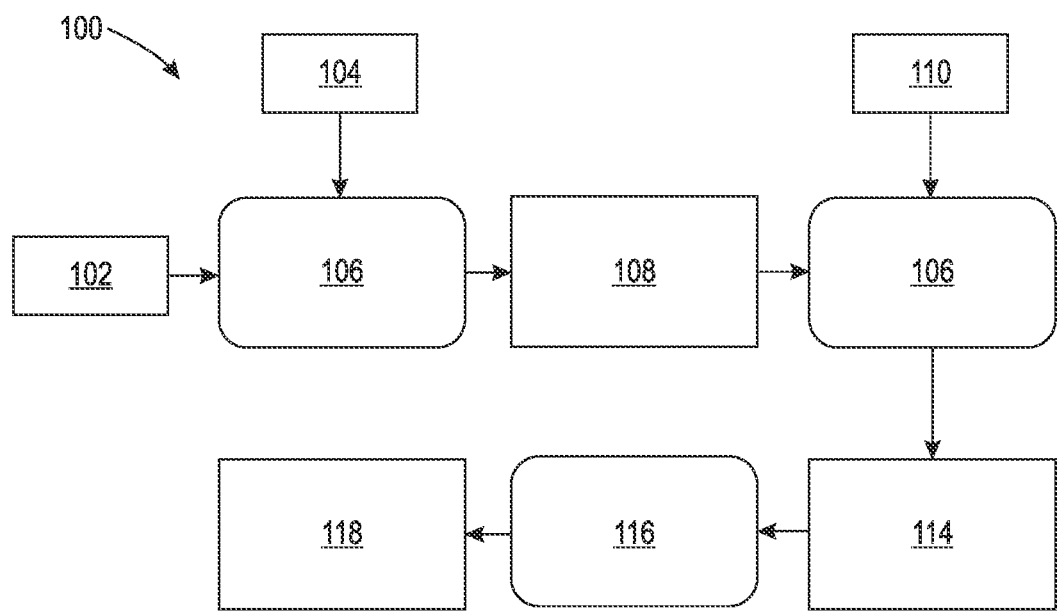
FIG. 1 illustrates a nonlimiting example of a method for generating a surrogate model of the methods and systems described herein.

The present disclosure relates to methods and computing systems for diagnosing faults in physical systems. More specifically, the methods and computing systems described herein may use a surrogate model (e.g., a neural network) that has been trained using data (e.g., experimental data and/or simulated data) regarding the behavior of the physical system in both nominal modes and faulty modes. Then, using data about the behavior of the physical system in question (e.g., a physical system exhibiting a faulty indicator), a Bayesian approach (i) identifies (or estimates) one or more potential modes of the physical system and (ii) computes the behavior probability (e.g., probability of physical system responses) for each of the potential modes given one or more excitations (e.g., input to the physical system). That is, the approach described herein first identifies potential modes of the physical system (e.g., mode A, mode B, and mode C) based on the data from the physical system using the surrogate model. Then, the approach learns exogeneous system excitations so that when the system exhibits a fault, the system behaves differently as from the case the system was in a different fault. The approach identifies one or more inputs (or system stimulus) (e.g., applying a voltage to portion of a circuit, increasing the RPM of an engine by 50%, decreasing catalyst flow rate by 1 sccm, and the like) and calculates the probability of the physical system response (or output) for each of the potential modes of the physical system (e.g., the response and probability thereof for each of mode A, mode B, and mode C when simulated with an increased feed flow rate or other stimulus). The approach optimizes these one or more input and corresponding output probabilities to give differentiation (preferably maximum differentiation) between the output probabilities for each of the potential modes. The input(s) that provide sufficient differentiation may then be applied to the physical system to probabilistically determine which of the one or more potential modes (faults) of the physical system is most likely the true mode of the physical system (sometimes referred to as a ground truth of the physical system).

Advantageously, the methods and computing systems described herein may improve the operation of a physical system by providing faster and/or more accurate fault diagnosis. Further, the methods and computing systems described herein may be applied to physical systems in operation where timely fault diagnosis may mitigate, if not eliminate, the need for shutting down some or all of the physical system.

Additionally, the methods and computing systems described herein may be applied to simulated physical systems where input(s) suitable for differentiating between faulty modes that display the same or similar physical system behavior may be predetermined and used in the operation of an existing or future physical system. This may allow for proactively having protocols in place to automatically ascertain (e.g., using a computing system like a controller, an operator, or a combination thereof) a probable true mode of the system when certain physical system behaviors are observed. This may allow for further improved timing of the fault diagnosis and remediation.

Nonlimiting examples of the methods and computing systems described herein are provided throughout the text rather than in a single section. Said examples should facilitate a better understanding of the embodiments of the present invention and in no way should said examples be read to limit, or to define, the scope of the invention.

Surrogate Model

FIG. 1 illustrates a nonlimiting example of a method for generating a surrogate model 118. A system model 102 of a physical system and fault modes 104 of the physical system are combined in a fault augmentation 106 of the system model to yield an augmented system model 108.

The system model 102 may be a high-fidelity, physics-based model that describes the physical system. That is, the system model 102 may be based on the physical principles (e.g., Newton's laws of motion, Kirchhoff's circuit laws, conservation of mass, momentum, charge, energy, and the like) that govern the actions and reactions of the physical system.

Any physical system may be used ranging from simple systems like a pendulum swinging or a simple circuit to complex systems like an internal combustion engine, a polymer synthesis reactor, or a ventricular assist device. Further, the physical system may be any existing or theoretical system. That is, the system model 102 may describe an existing physical system or a theoretical physical system based on the physical principles.

Physical systems may include mechanical systems, electrical systems, thermal systems, the like, and hybrid systems that incorporate one or more aspects of any combination of the foregoing systems.

System models 102 typically describe the normal operation of a physical system (also known as nominal modes of the physical system). That is, the system model 102 may describe a well-oiled pendulum swinging without external forces like a cross-breeze acting upon the pendulum.

Modes describe the state and function of the physical system, which may include information like relative spacing of components of the physical system, a coefficient of friction for a component of the physical system, a viscosity of a fluid in the physical system, and so on. The descriptive portions of the state of the physical system or mode will depend on the physical system. For example, a circuit will have different physics-based descriptive components than a jet engine. One skill in the art of the physical system will understand how to describe different modes of the system, whether said modes be nominal modes or faulty modes.

Fault modes 104 may describe the physical system behavior when a fault is present. For example, a rusty spot on the pivot point of the pendulum may create friction that alters the swing of the pendulum. Fault modes 104 may use physics-based principles to account for the possibility of certain faults in the system.

During fault augmentation 106, the fault modes 104 may be integrated into the system model 102 so that the augmented system model 108 may be a high-fidelity, physics-based model that describes the physical system in both nominal modes and fault modes 104. For example, a friction component may be added at the pivot point of the pendulum. Said friction component may be variable to allow for modeling the movement of the pendulum based on the degree of friction rather than the exact cause of the friction.

Because the augmented system model 108 may be high-fidelity, physics-based model, the computation time for implementing such a model in the methods and systems described herein may be greater than desired. Accordingly, in the illustrated method 100, the augmented system model 108 along with inputs 110 are used to generate 112 high quality training data 114.

When generating 112 the training data 114, the inputs 110 may be applied to the augmented system model 108 to produce output data regarding the physical system actions and reactions to the inputs 110. The inputs 110 may be chosen and/or random. The inputs 110 depend on the physical system. Again, the inputs to a circuit would be different than to a jet engine. One skill in the art of the physical system will understand suitable inputs for the augmented system model.

Because the augmented system model 108 is based on fault modes 104, the actions and reactions to the inputs 110 may include when one or more faults are present in the physical system. The training data 114 may include the inputs 110 and corresponding outputs (e.g., system action and reactions) of the physical system in a plurality of modes including nominal and faulty modes.

The resultant training data 114 may then be used for training 116 a surrogate model 118. Generally, the surrogate model 118 mimics the behavior of the augmented system model 108, preferably using differential equations (or difference equations in discrete cases). The surrogate model 118 may be produced by training 116 a neural network (e.g., a recurrent neural network). The training 116 may use automatic differentiation methods to compute automatically loss function gradients and enable the use gradient-based algorithms. Such gradient-based algorithms are much faster than gradient-free optimization algorithms that typically do not scale with the number of optimization variables. Therefore, the surrogate model 118 mimics the behavior of the augmented system model 108 but with significantly less computing time given the same computing power. Accordingly, the surrogate model 118 allows for real-time methods and computing systems for fault diagnosis (described further herein).

The example discussed throughout the present disclosure uses a Cauer low pass analog filter. This is a nonlimiting example to illustrate the methods and computer systems described herein. The methods and computer systems of the present disclosure may be applied to any physical system.

Figure 2:
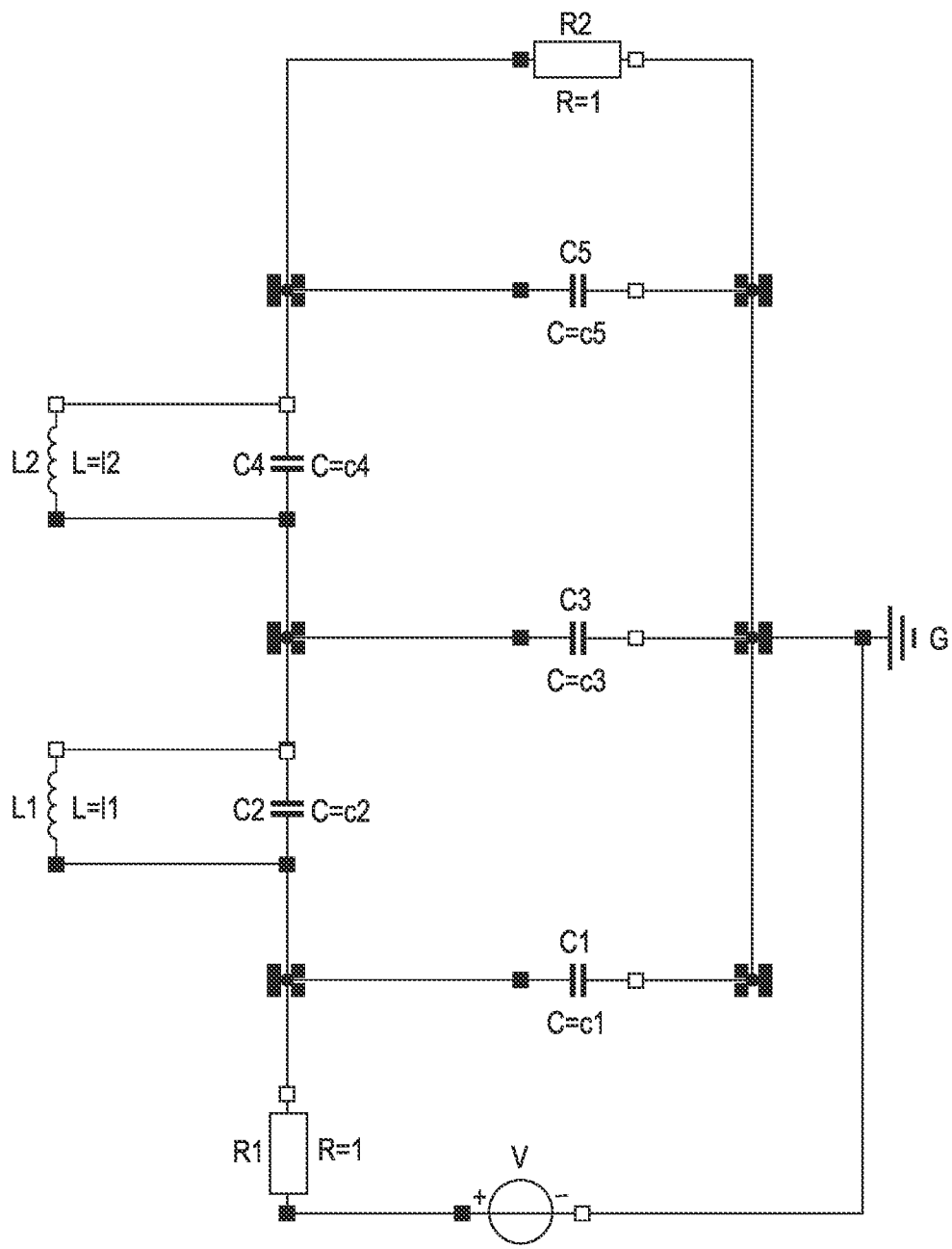
FIG. 2 illustrates a Cauer low pass analog filter with three open connection faults that remove components from the circuit.
Figure 3:
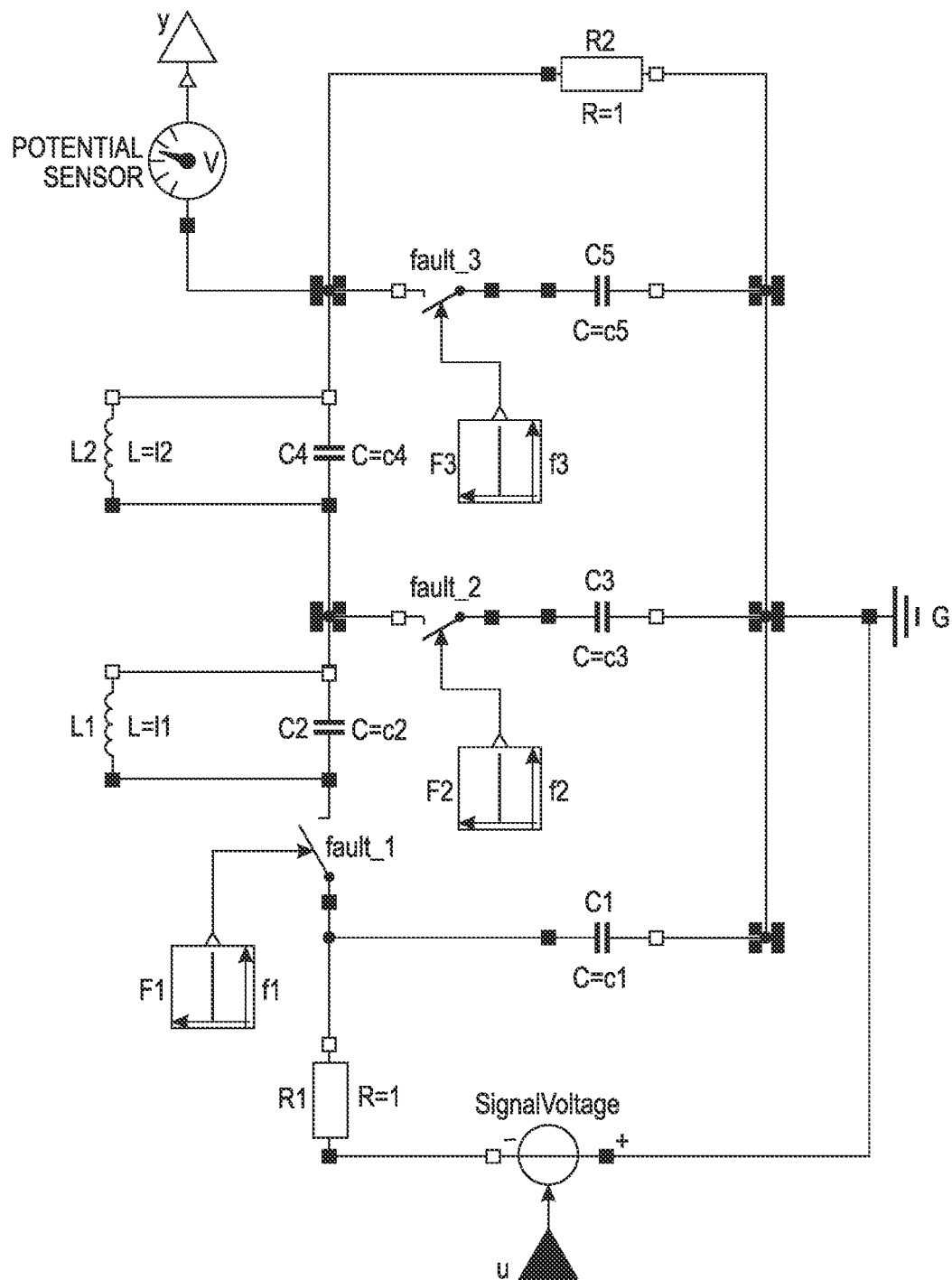
FIG. 3 illustrates an augmented system model of the Cauer low pass analog filter of FIG. 2.
Figure 4A:
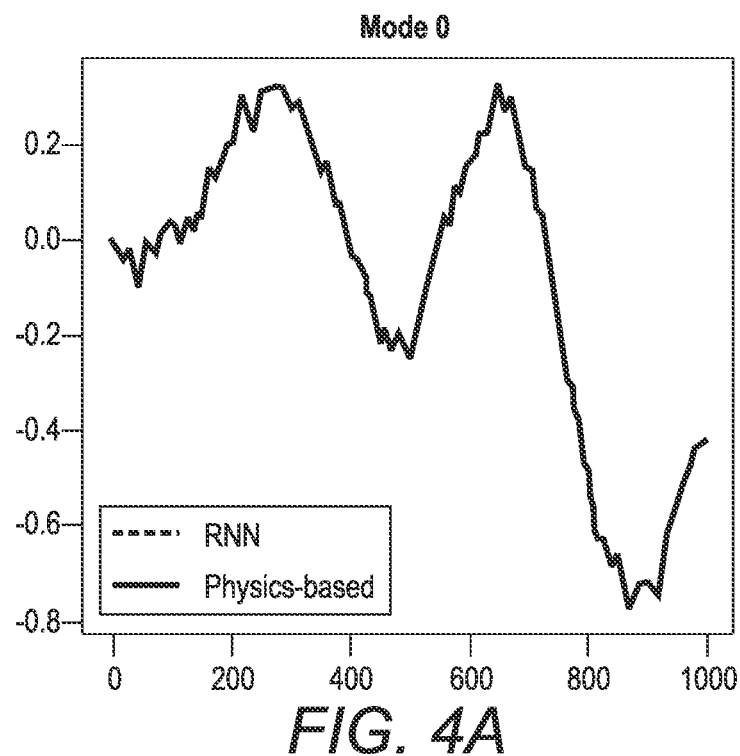
FIGS. 4A-D illustrate a comparison between the outputs of the trained recurrent neural network and the augmented system model for the Cauer low pass analog filter example.
Figure 4B:
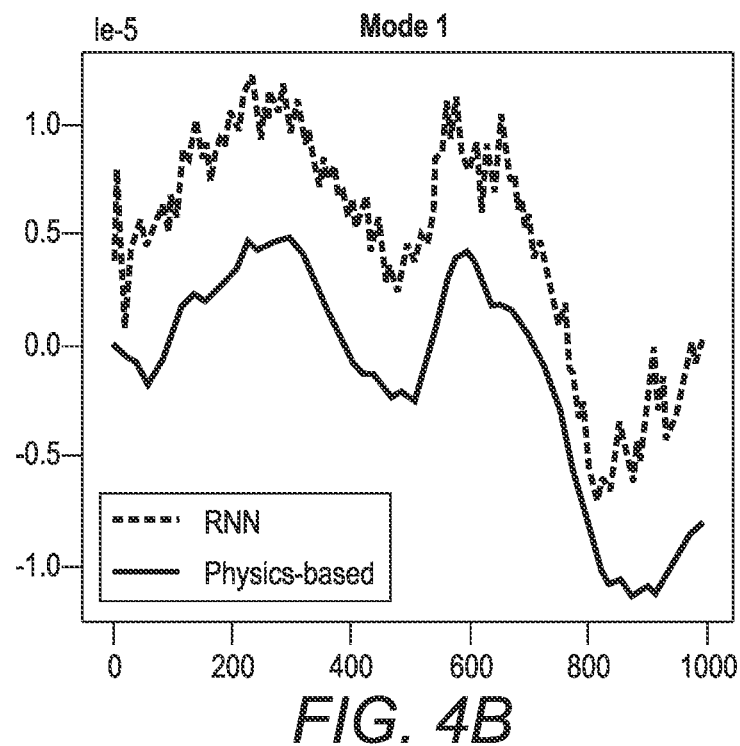
Figure 4C:
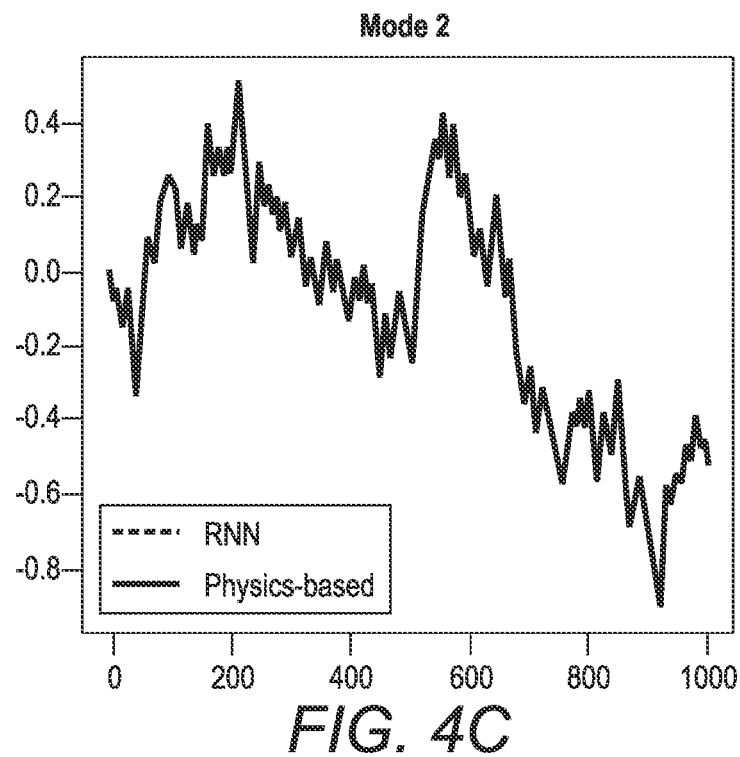
Figure 4D:
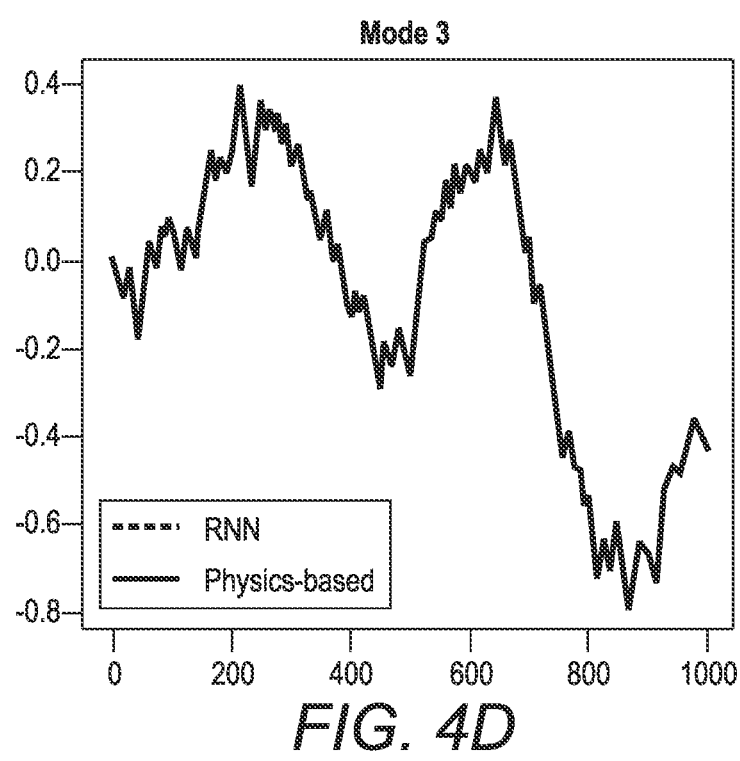

FIG. 2 illustrates a Cauer low pass analog filter with three open connection faults that remove components from the circuit. FIG. 3 illustrates an augmented system model of the Cauer low pass analog filter of FIG. 2. FIG. 3 shows the implementation of the open connection faults through electrical switches. Here the input u is the voltage provided by the signalVoltage voltage source, and the output y is the voltage measured across the resistor R2.

For the physics-based model, consider (analog) physical systems may be described by differential algebraic equations (DAEs) of the form of EQS. 1-2.

$$0 = F(\dot{x}, x, u, w), x(0) = x_0 \quad \text{EQ. 1}$$

$$y = h(x, u, v) \quad \text{EQ. 2}$$

where x is the state vector, u is the vector inputs, w is the state noise, y is the vector outputs, and v is the measurement noise. EQS. 1-2 represent the system model under nominal behavior. The system is affected by a set $\mathcal{F} = \{f_1, \ldots, f_N\}$ of discrete faults that change the system behavior. Each of the faults together with the nominal behavior induce N+1 modes of operation for the physical system. Using θ to denote the mode of operation, the multi-mode, system model takes the form of EQS. 3-4.

$$0 = F_\theta(\dot{x}, x, u, w), x(0) = x_0 \quad \text{EQ. 3}$$

$$y = h_\theta(x, u, v) \quad \text{EQ. 4}$$

where θ denotes the current mode and takes values in a discrete $\mathcal{M} = \{0, 1, \ldots, N\}$, where index zero corresponds to the nominal behavior.

The surrogate model using a neural network (more specifically, a recurrent neural network or RNN like a long short-term memory network or LSTM) was used to model the behavior of dynamical system. Rather than learning one RNN for each mode, in this example, a RNN learned from all modes with separate outputs for each of the mode. The RNN had N+1 outputs (N=3 in this case) where $y_{0:T}^i$ corresponds to the behavior of the system in mode i, over the time interval [0,T].

Training data was first generated from the augmented system model of the Cauer low pass analog filter and used to train the RNN so that the RNN mimics the response of the augmented system model. Inputs for generating the data from the augmented system model were persistent random signals (e.g., a Pseudo-Random Binary Sequence) that excite the system at different frequencies to elicit a diverse behavior. Signal sequences were considered that covered a 20 sec time interval (i.e., T=20 sec), sampled at 0.02 sec. 10,000 such sequences were generated and used as inputs for the augmented system model in each of the four modes to collect the four outputs. Training of the RNN was done using Pytorch deep learning platform where the model had one hidden layer of size 40 using GRU cells, followed by a linear layer with a four-dimensional output. Adam algorithm was used to train the RNN for obtaining a mean square error (MSE) of $2.37 \times 10^{-6}$. A comparison between the outputs of the trained RNN and the augmented system model is shown in FIG. 4, demonstrating that the RNN matches closely the behavior of the augmented system model. Note that unlike typical machine learning applications, as much training data as needed can be generated, and hence there is less worry about over-fitting the RNN. Other platforms for training include TensorFlow and Jax.

Identifying Potential Modes

Using a surrogate model trained based on the data generated by the augmented system model, a Bayesian approach (i) identifies (or estimates) one or more potential modes of the physical system and (ii) computes the behavior probability (e.g., probability of physical system responses) for each of the potential modes given one or more excitations (e.g., input to the physical system). This section describes identification of potential modes. The determination of a true mode (or most likely true mode) may be achieved by multiple methods including a single test input approach and a multiple test input approach. Said approaches are discussed in later sections.

In a physical system (e.g., an actual system or a simulated system), a fault indicator may be identified. A fault indicator may be a sensor measurement, a system output, an alarm, or other indicator that signals the system has one or more faults (or is operating in a faulty mode). The data from the system may be an input to the augmented system model, which estimates one or more potential faulty modes that could correspond to said data. Estimating said potential faulty modes may be probabilistic based. Further, thresholds may be so that potential faulty modes that fall within the thresholds are used in the further analysis to determine inputs (or excitations) to the physical system that may be useful in differentiating between the potential faulty modes to arrive at the true mode (or most likely true mode).

Bayesian Approach to Estimate Most Likely Mode

The methods and computer systems described herein may use a Bayesian approach (mathematically detailed below) to estimate which of the one or more potential faulty modes is the true mode (or most likely true mode). Generally, the approach applies an input (or stimulus) to the physical system (e.g., application of an electrical current at specific locations, a change in pressure or temperature, and the like depending on the physical system) in each of the one or more potential faulty modes using the surrogate model to produce an output (reaction of the physical system) for each of the one or more potential faulty modes. The outputs for a given input may then be compared to determine a difference (or similarity metric) in the outputs for each of the one or more potential faulty modes. This may be repeated for several inputs where the input(s) that provide well differentiated outputs (e.g., smallest value of the similarity metric) may be used in the single test input approach and a multiple test input approach described below for testing the physical system to determine the true mode (or most likely true mode) of the physical system. The one or more faults in said true mode may then be used to take an action and mitigate the fault.

In more detail, a Bayesian approach may be used to estimate the mode $\theta$. A time horizon $[0, T]$ was considered over which the system's inputs and outputs were measured. The current mode was computed as the solution of the optimization problem of EQ. 5.

$$i^* = \text{argmax}_i p(\theta = i | y_{0:T}, u_{0:T}) \quad \text{EQ. 5}$$

where $y_{0:T}$ and $u_{0:T}$ are the measured outputs and inputs over the time interval $[0, T]$. Using Bayes rule, the probability $p(\theta = i | y_{0:T}, u_{0:T})$ can be expressed as EQ. 6.

$$p = (\theta = i | y_{0:T}, u_{0:T}) = \frac{f(y_{0:T} | \theta = i; u_{0:T}) p(\theta = i)}{\sum_{j=0}^{N} f(y_{0:T} | \theta = j; u_{0:T}) p(\theta = j)} \quad \text{EQ. 6}$$

where $f(y_{0:T} | \theta = i; u_{0:T}) p(\theta =$ denotes the joint conditional probability density function of $y_{0:T}$, conditioned on the mode and the system inputs. When neglecting the state noise w and assuming that the measurement noise is normally distributed, with zero mean, then $y_{0:T} | \theta = j$; $u_{0:T}$ has a joint normal distribution with mean $\hat{y}_{0:T}^i$, where $\hat{y}^i$ is the output of the system model in mode i, and variance that depends on the measurement noise variance. Therefore, given that i* is the true mode, the terms that control the value of $p(\theta = i | y_{0:T}, u_{0:T})$ are $|y_{i*}(t) - y_j(t) + v(t)|$, for $j \in \{0, \ldots, N\}$, where $y_j(t)$ is the model output in mode j. The larger the difference $|y_r(t) - y_j(t)|$ the better the mode i* is emphasized since $f(y_{0:T} | \theta = j; u_{0:T})$ for $j \neq i^*$ are much smaller as compared to $f(y_{0:T} | \theta = i^*; u_{0:T})$.

How similar two vectors are can be evaluated using the cosine similarity metric defined as $$C(x, y) \triangleq \frac{x^T y}{\|x\| \|y\|}.$$

A value $C(x,y)=1$ means that the two vectors x and y are identical, and as the vectors x and y are more different, the cosine similarity metric decreases. Therefore, a good strategy to emphasize the true mode is to make sure that the outputs in different modes are different. We can control the outputs by choosing inputs u such that $y^i$ and $y^j$ are as different as possible for any two modes $i \neq j$.

Single Test Input Approach

In a first implementation of the Bayesian approach, the objective is to generate a single input that corresponds to outputs to the one or more potential faulty modes that are as different as possible. The number of optimization variables tested may be controlled by imposing a maximum number of points for describing the inputs and assuming a piecewise constant input signal.

For example, let M denote the number of points for the input. Then, the input signal over the time interval $[0, T]$ is given by $u(t) = u_j[1(t - t_j(t - t_{j+1})]$, for $t \in t_{j+1}$), for $j \in \{1, \ldots, M\}$, where $1(t)$ denote step function. Note that this initial representation of the input signal is not differentiable. An approximate smooth representation can be generated by approximating the step function with the sigmoid function given by $$\sigma(t) = \frac{1}{1 + e^{-t}}.$$

It follows that a smooth approximation of a piecewise constant input signal can be expressed as $u(t) = u_j[\sigma(\beta(t - t_1)) - \sigma(\beta(t - t_{j+1}))]$ for $t \in t_j, t_{j+1}$), for $j \in \{1, \ldots, M\}$, where $\beta$ is a large positive constant. With this parameterization of the input signal, EQS. 7-9 may be an optimization problem.

$$\min_{u_l \in U} \sum_{i=0}^{NM} \sum_{j=i+1}^{N} C\left(\hat{y}_{0:T}^i, \hat{y}_{0:T}^j\right) \quad (7)$$

$$\hat{y}(t) = RNN(u(t)), \ y(t) = [\hat{y}_0(t), \ldots, \hat{y}_N(t)], \quad (8)$$

$$u(t) = u_l[\sigma(\beta(t - t_l)) - \sigma(\beta(t - t_{l+1}))], \ \forall t \in [t_l, t_{l+1}), \ \forall l \in \{1, \ldots, M\}, \quad (9)$$

where U is compact set that bounds the input magnitude and RNN(•) is the surrogate model for the physics-based model that includes all the system modes.

Figure 5:
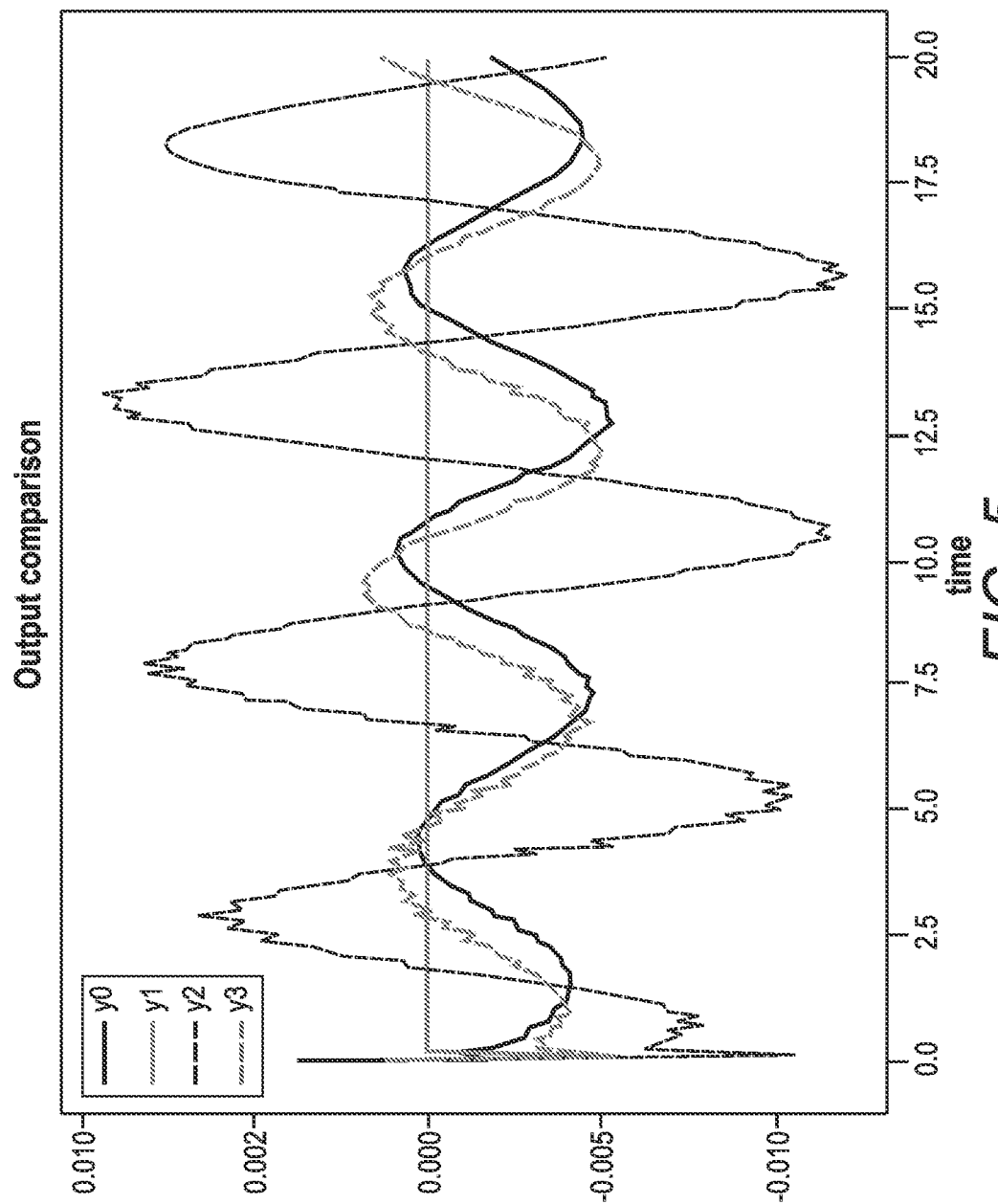
FIG. 5 is a plot of cosine similarity metric comparison for the model outputs corresponding to the four potential faulty modes (y0, y1, y2, and y3).
Figure 6:
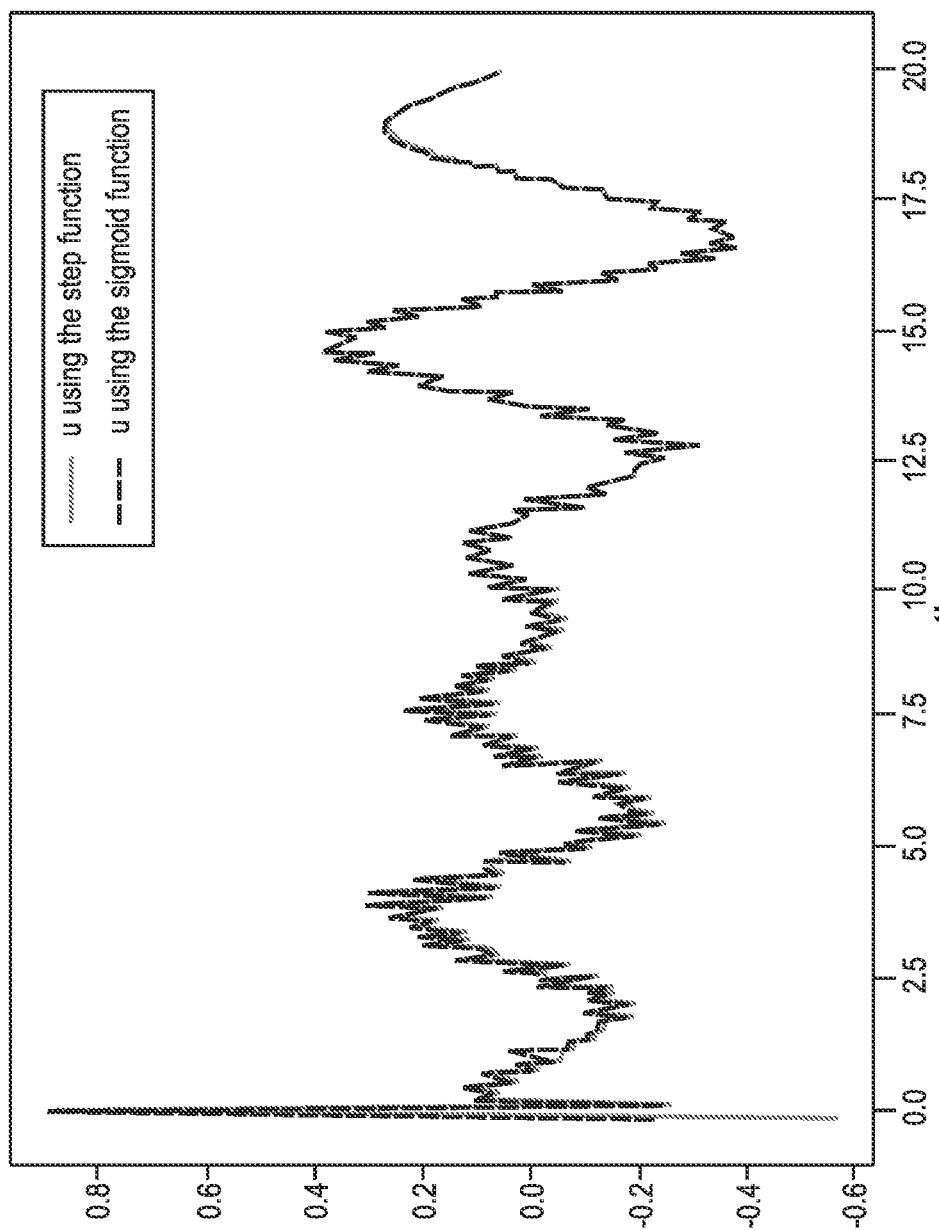
FIG. 6 is a plot of the input that minimizes the similarity between the four potential faulty modes using the cosine similarity metric.

Referring back to the Cauer low pass analog filter example, the foregoing optimization problem was implemented and solved Pytorch using Adam algorithm for 2000 iterations with a constant step size of 0.002. FIG. 5 is a plot of cosine similarity metric comparison for the model outputs corresponding to the four potential faulty modes (y0, y1, y2, and y3). FIG. 6 is a plot of the input that minimizes the similarity between the four potential faulty modes.

Note that the output corresponding to mode 1 (y1) is approximately zero. This is not a surprise since the fault corresponding to fault 1 cuts the voltage source from the rest of the circuit. The similarities between the outputs are shown in Table 1.

TABLE 1

| Mode output similarities using a cosine similarity metric | | | | |
|---|---|---|---|---|
| | y0 | y1 | y2 | y3 |
| y0 | 1 | −0.77 | −0.3 | 0.85 |
| y1 | −0.77 | 1 | −0.19 | −0.61 |
| y2 | −0.3 | −0.19 | 1 | −0.12 |
| y3 | 0.85 | −0.61 | −0.12 | 1 |

As illustrated in FIG. 5 and Table 1 modes 0 (y0) and 3 (y3) are the closest ones, while the rest have a significantly different behavior. Therefore, if mode 0 or mode 3 are identified as the potentially true mode of the physical system when the input is applied, the certainty of the result may not be as high as if mode 1 or mode 2 were identified as the potentially true mode.

However, the single input test approach may incorporate a regularization term that encourages increased magnitudes. Such a regularization term can be formulated in terms of the negative of the outputs infinity norm. Alternatively, the loss function can be reformulated in terms of the L2 norm of the mode outputs difference and use a regularization term that encourages similar magnitude values.

Figure 7:
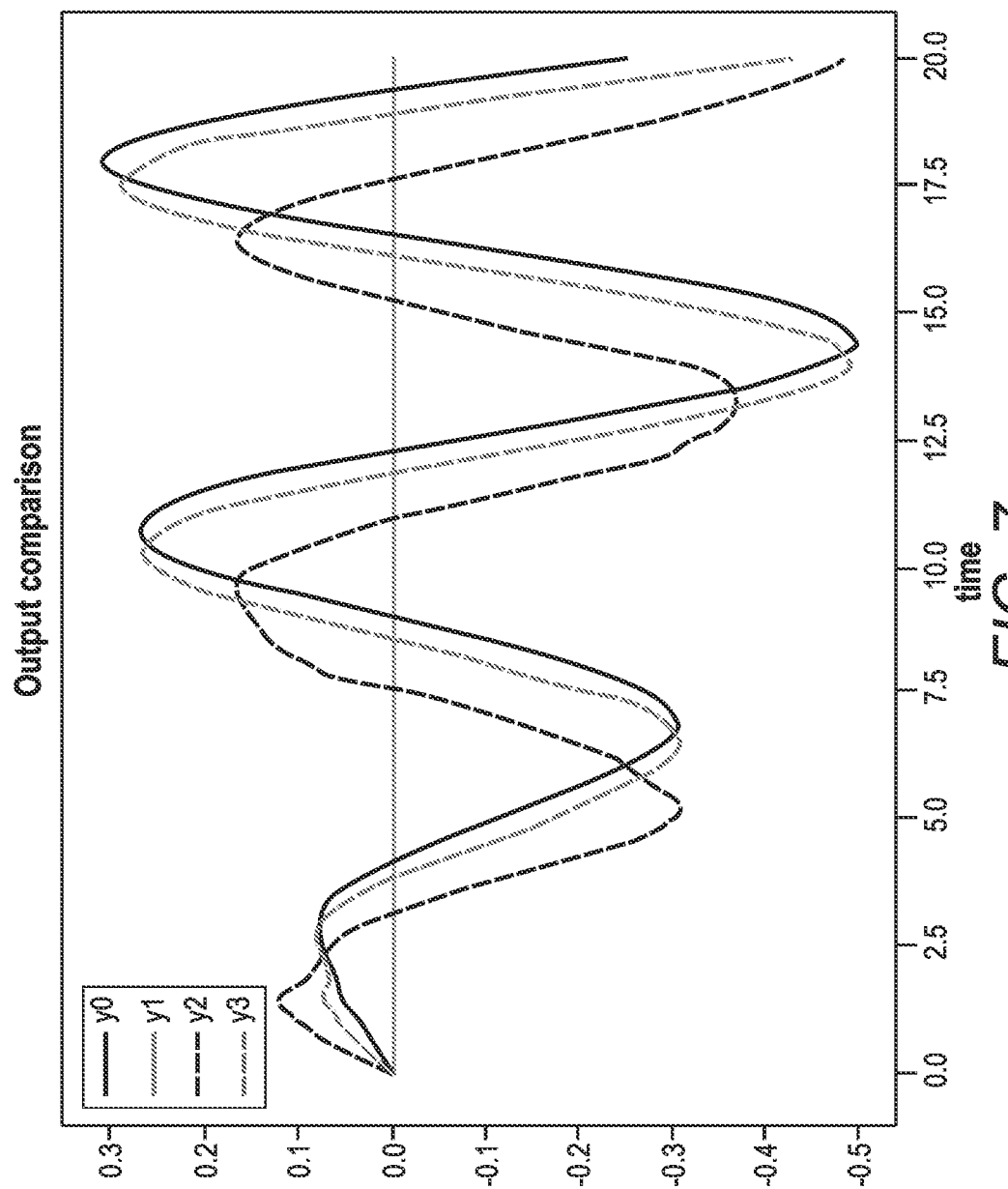
FIG. 7 is a plot of L2 similarity comparison metric for the model outputs corresponding to the four potential faulty modes (y0, y1, y2, and y3).
Figure 8:
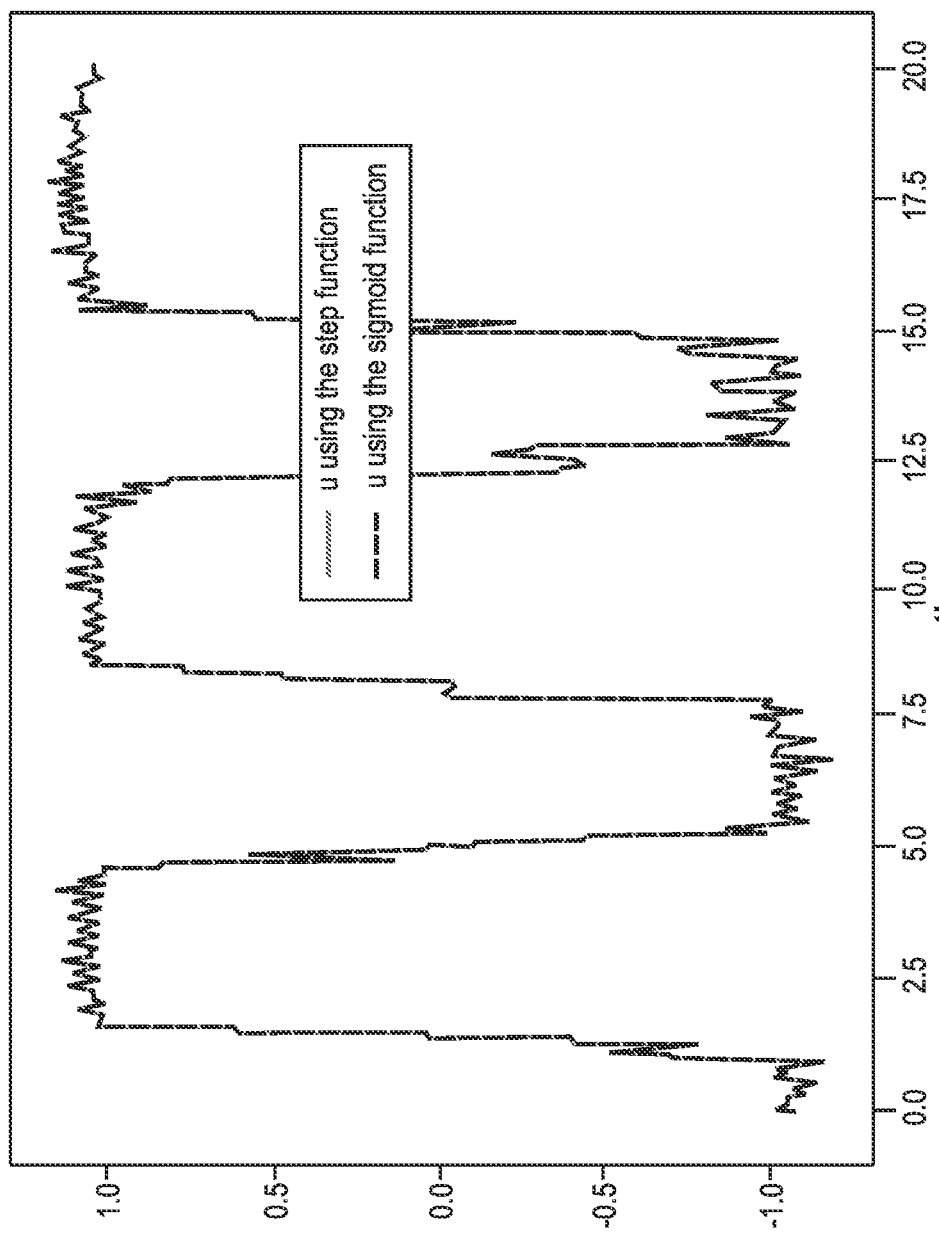
FIG. 8 is a plot of the input that minimizes the similarity between the four potential faulty modes using the L2 similarity metric.
Figure 9A:
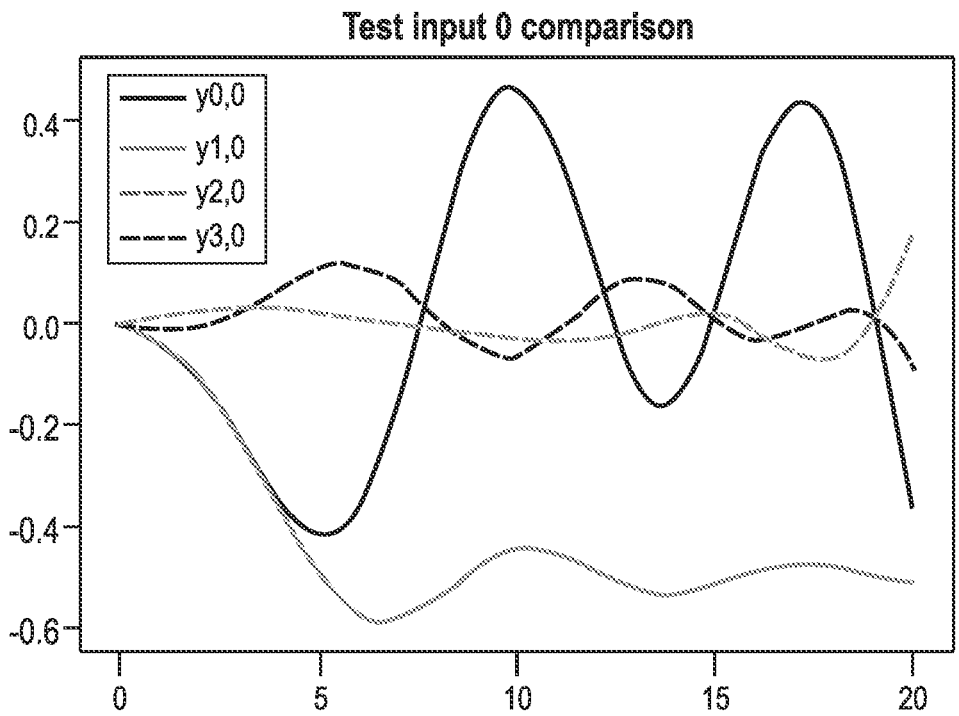
FIGS. 9A-D are plots of the outputs corresponding to each system mode for each test input and the optimal test inputs that make the outputs as different per the cosine similarity metric.
Figure 9B:
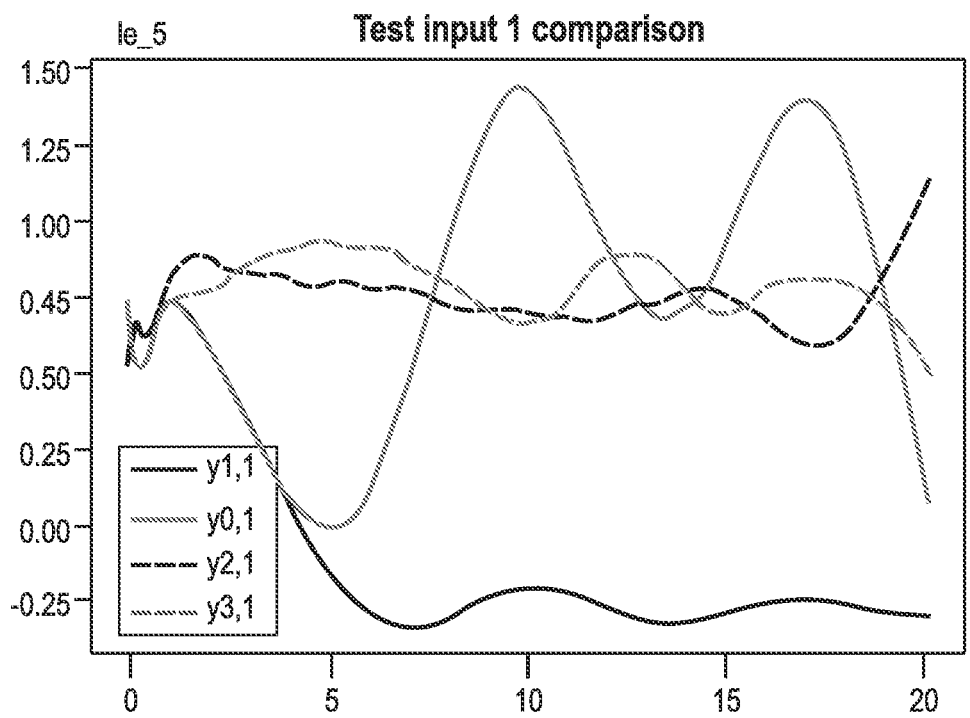
Figure 9C:
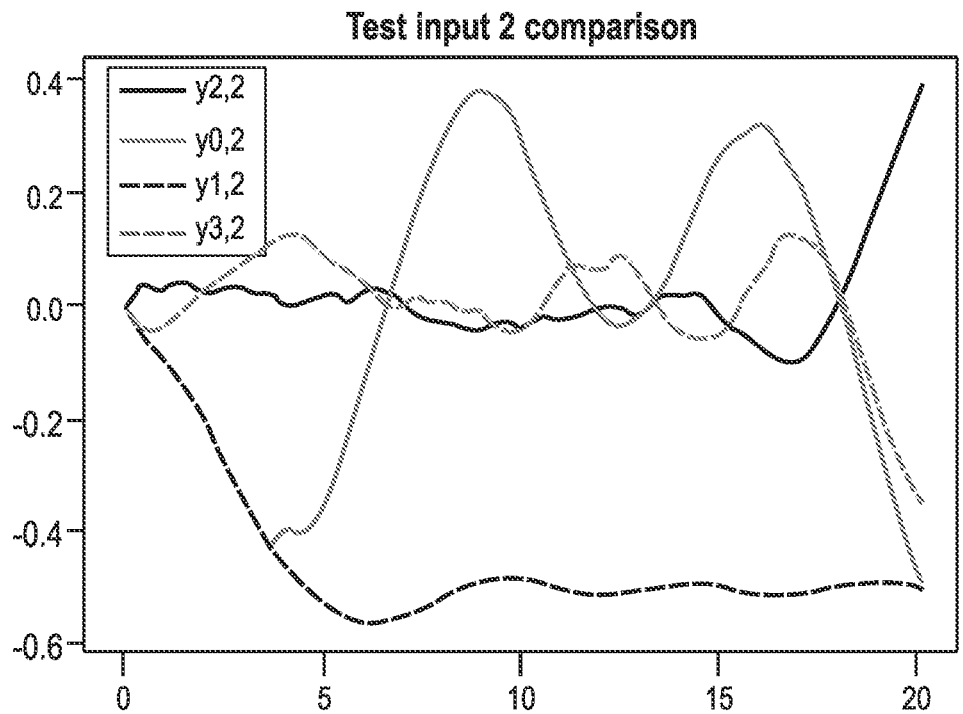
Figure 9D:
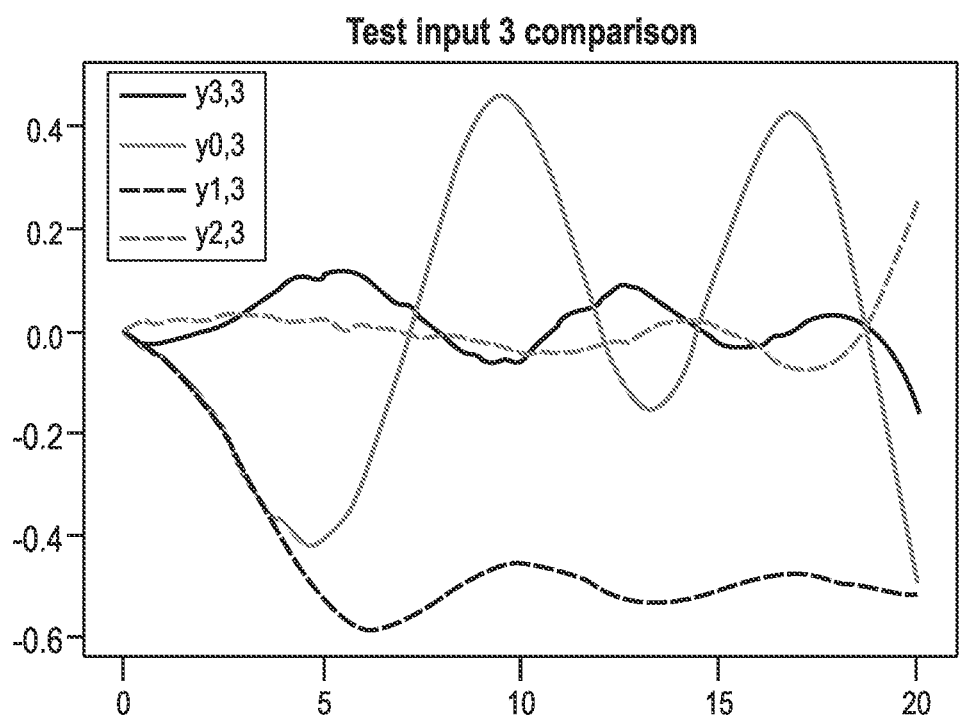
Figure 10A:
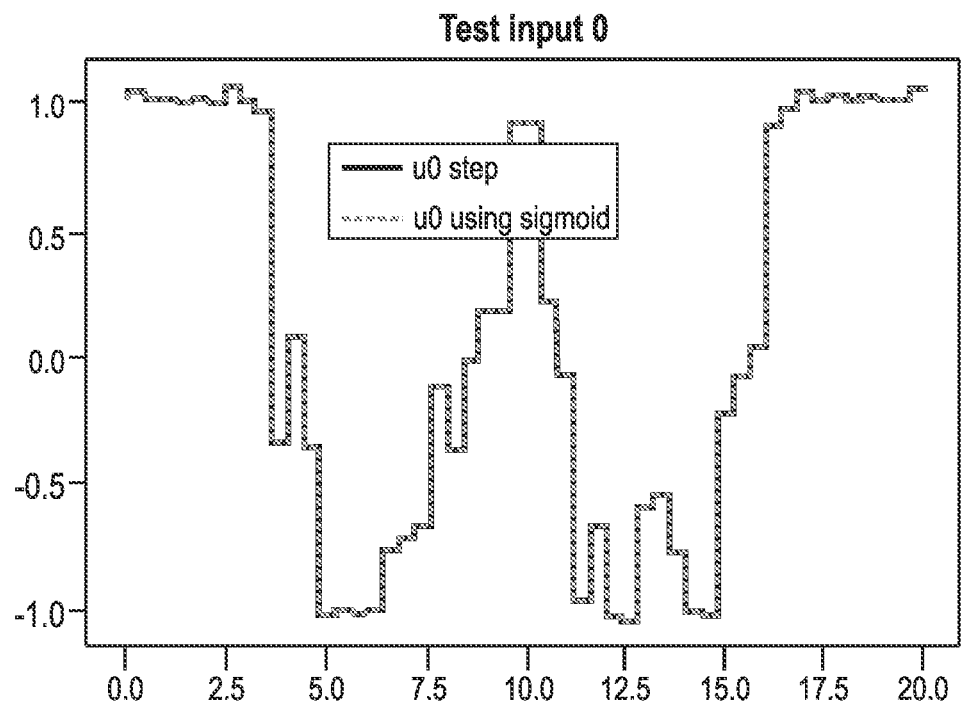
FIGS. 10A-D are plots of the test inputs that make the outputs different per the cosine similarity metric.
Figure 10B:
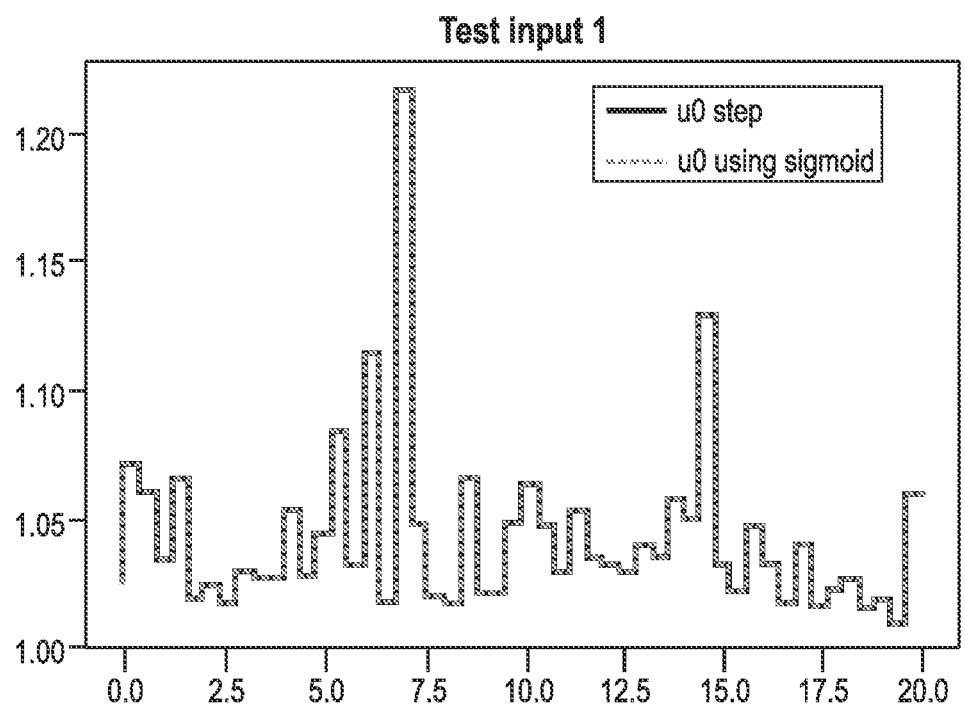
Figure 10C:
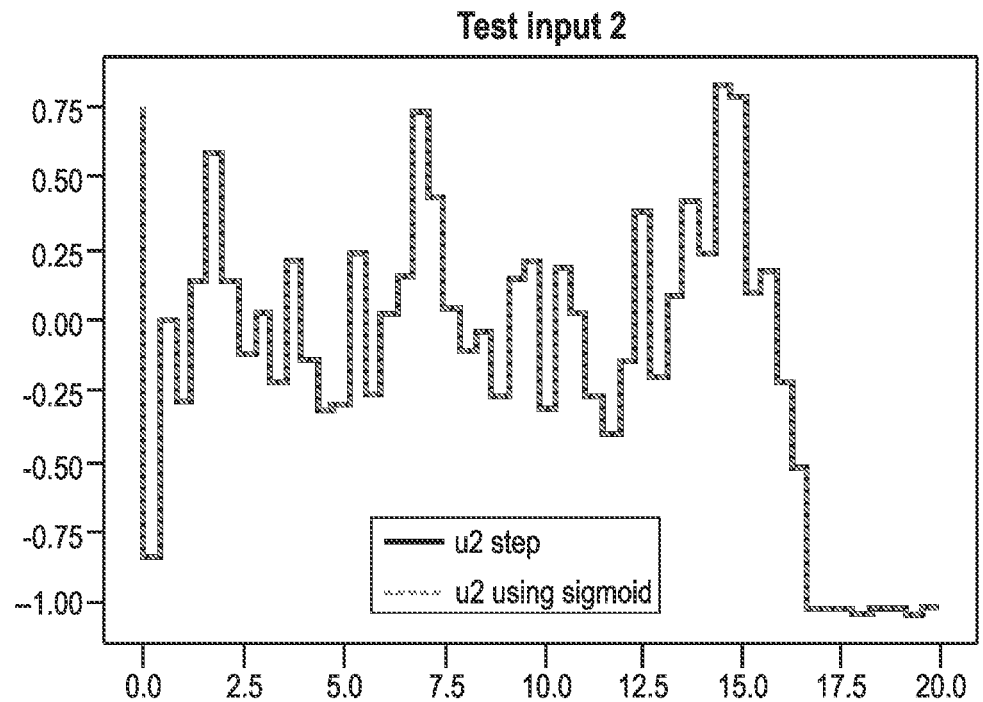
Figure 10D:
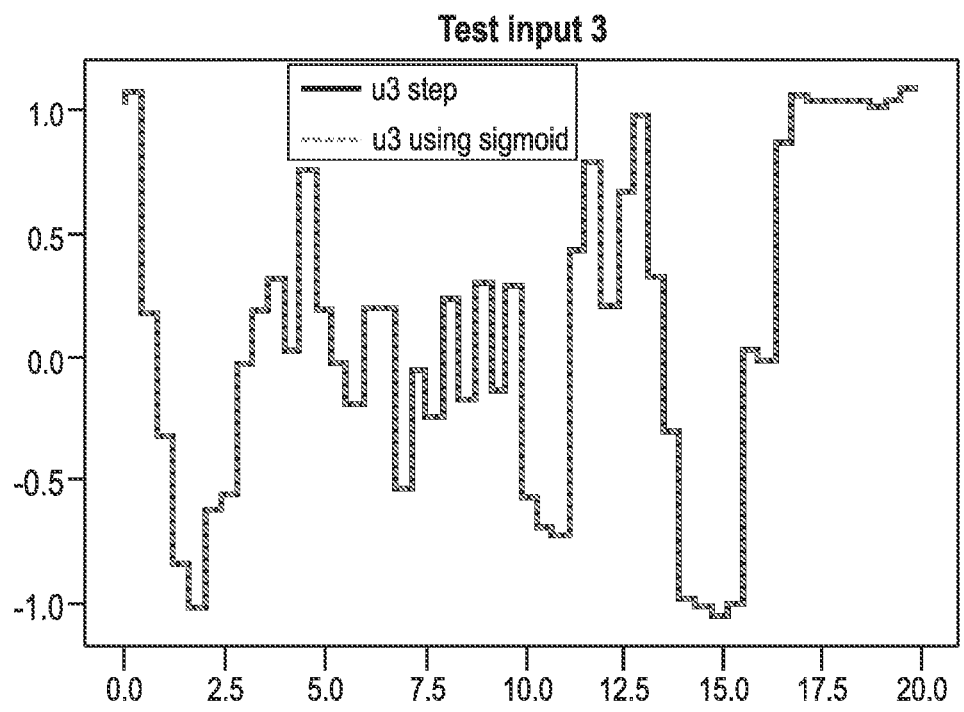

For example, let $l_k = -\|y_{0:T}^i - y_{0:T}^j\|^2$, for $i \neq j$, where a value of the index k corresponds to a pair (i,j). Then the new loss function is defined as $\pounds(u) = \Sigma_k l_k(u) + \lambda \Sigma_{i,j>i}(l_i - l_k)^2$, where the regularization term encourages "consensus" between the $l_k$'s. With the new loss function, the optimization procedure was repeated using the surrogate model and Adam algorithm, with a step size of 0.002 and a regularization weight of 0.01. The results are shown in FIGS. 7-8 and Table 2. FIG. 7 is a plot of L2 similarity comparison metric for the model outputs corresponding to the four potential faulty modes (y0, y1, y2, and y3). FIG. 8 is a plot of the input that minimizes the similarity between the four potential faulty modes using the L2 similarity metric. Qualitatively Tables 1 and 2 are similar, but Table 2 provides larger differences between outputs.

TABLE 2

Mode output similarities using a L2 similarity metric

| | y0 | y1 | y2 | y3 |
|---|---|---|---|---|
| y0 | 1 | 0.24 | 0.36 | 0.92 |
| y1 | 0.24 | 1 | −0.10 | 0.22 |
| y2 | 0.36 | −0.10 | 1 | 0.66 |
| y3 | 0.92 | 0.22 | 0.66 | 1 |

Multiple Input Test Approach

In a second implementation of the Bayesian approach, the objective is to generate a design of test inputs to emphasize the physical system behavior in the potential faulty modes. The number of optimization variables tested may be controlled by imposing a maximum number of points for describing the inputs and assuming a piecewise constant input signal.

In the multiple input test approach, a goal may be to design test inputs such that two test inputs induce a different behavior in the same mode. In other words, the test input $u_{0:T}^i$ designed to showcase mode i may induce a different output when applied to mode j, as compared to the mode j output induced by test input $u_{0:T}^j$. For example, test input $u_{0:T}^i$ may showcase mode i by causing the output of mode i to be clearly differentiable from the output of mode j (e.g., a cosine similarity metric of −0.7), the test input $u_{0:T}^j$ may produce an output of mode i that is not as clearly differentiable from the output of mode j (e.g., a cosine similarity metric of 0.2), but the output of mode j from test input $u_{0:T}^i$ and the output of mode j from test input $u_{0:T}^j$ may be clearly differentiable (e.g., a cosine similarity metric of 0.9).

More specifically, let $y_{0:T}^{ji}$ denote the output of mode j when the input $u_{0:T}^i$ is applied. The test inputs may be designed to minimizing the loss function $\pounds(u_{0:T}^i, i \in \{0, \ldots, N\}) = \Sigma_{j=0}^N \Sigma_{i=0}^N C(y_{0:T}^{ii}, y_{0:T}^{ji})$. In particular, the following optimization problems of EQS. 10-12 may be used.

$$\min_{u_{ii} \in U} \sum_{j=0}^{M} \sum_{i=0}^{M} C\left(y_{0:T}^{ji}, y_{0:T}^{ji}\right) \qquad (10)$$

$$\hat{y}_i(t) = RNN(u_i(t)), y(t) = [\hat{y}_{i0}(t), \ldots, \hat{y}_{iN}(t)], 0 \leq t \leq T, \qquad (11)$$

$$u_i(t) = u_{il}[\sigma(\beta(t-t_l)) - \sigma(\beta(t-t_{l+1}))], \forall t \in [t_l, t_{l+1}), \qquad (12)$$

$$\forall l \in \{1, \ldots, M\}, 0 \leq t \leq T.$$

Referring back to the Cauer low pass analog filter example, similar to the single input case, the optimization problem (EQ. 10) was implemented and solved in Pytorch, using Adam algorithm for 2000 iterations with a constant step size of 0.002. FIG. 9 illustrates a plot of the outputs corresponding to each system mode for each test input and the optimal test inputs that make the outputs as different per the cosine similarity metric. FIG. 10 illustrates a plot of the test inputs that make the outputs different per the cosine similarity metric.

Figure 11:
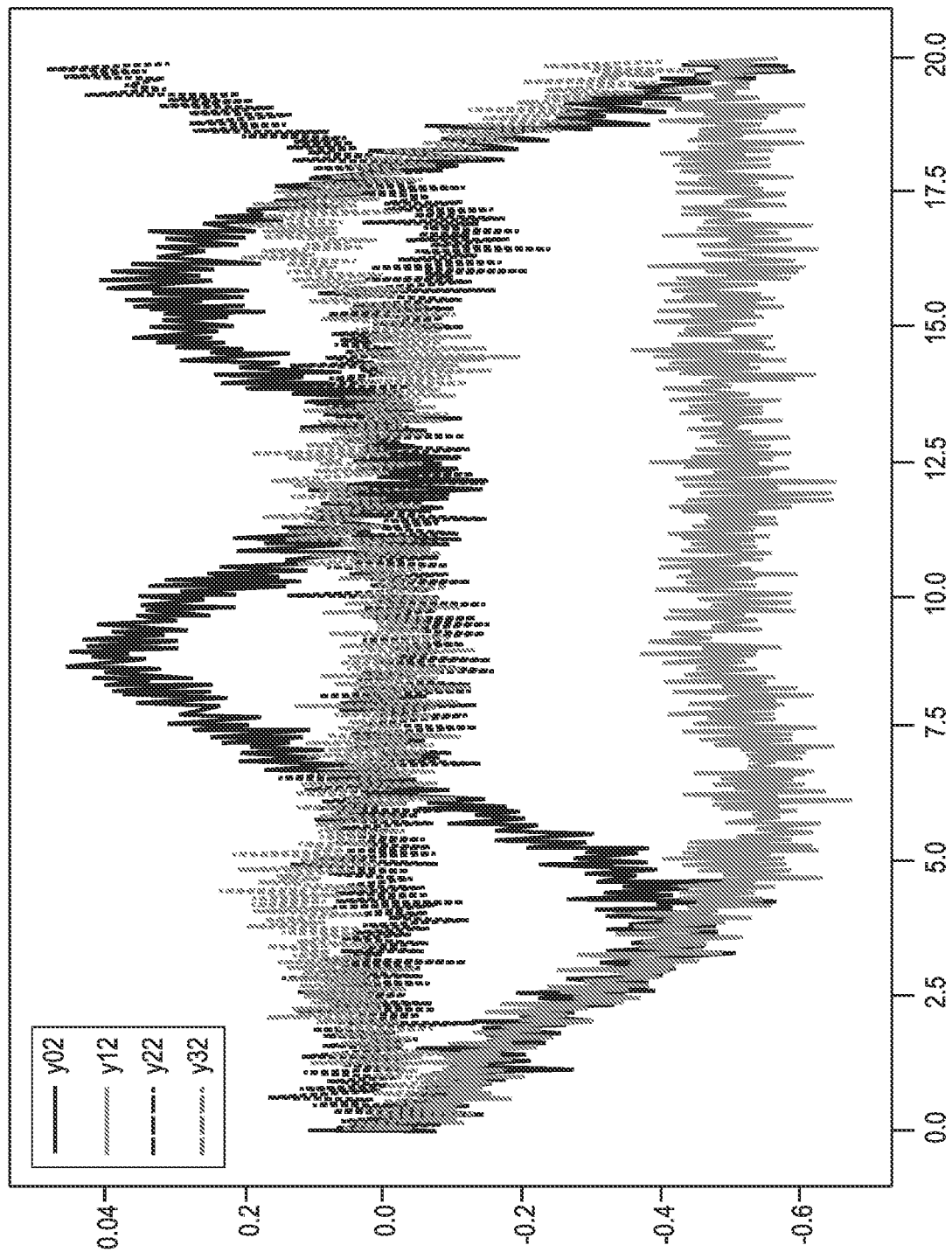
FIG. 11 is a plot of the noisy outputs as a result of applying the test inputs to mode 2.

To demonstrate the effects of the test input by using a Bayesian approach to learn the mode probabilities, let mode 2 be the ground truth (or the true mode). The noisy outputs as a result of applying the test inputs are shown in FIG. 11, where the variance of the zero mean, Gaussian noise is $\sigma = 0:05$. Let $p_{ij}$ denote the probability of the system to be in mode j, when applying input ui (i.e., $p_{ij} = P(\theta = j | y_{0:T}^{ij}, u_{0:T}^i)$, quantity which can be compute according to (6), where a uniform distribution for the mode prior is assumed. The table of these probabilities is shown in Table 3 indicating that mode 2 is indeed the most likely system mode, with an average probability $7:91*10^{-1}$, where the average is taken over the inputs.

TABLE 3

Mode probabilities for each test input

| | mode 1 | mode 2 | mode 3 | mode 4 |
|---|---|---|---|---|
| $u_0$ | 3 7 * $10^{-9}$ | 5.53 * $10^{-14}$ | 9.99 * $10^{-1}$ | 1.13 * $10^{-4}$ |
| $u_1$ | 1.31 * $10^{-1}$ | 8.84 * $10^{-49}$ | 5.7 * $10^{-1}$ | 2.97 * $10^{-1}$ |
| $u_2$ | 6.93 * $10^{-2}$ | 1.93 * $10^{-2}$ | 6.98 * $10^{-1}$ | 2.12 * $10^{-1}$ |
| $u_3$ | 1.68 * $10^{-2}$ | 1.42 * $10^{-2}$ | 8.98 * $10^{-1}$ | 7 * $10^{-2}$ |

Implementation

The surrogate models described herein may be implemented in methods and computer systems to diagnose (or identify) faults in a physical system by the single input test, the multiple input test, or both.

Figure 12:
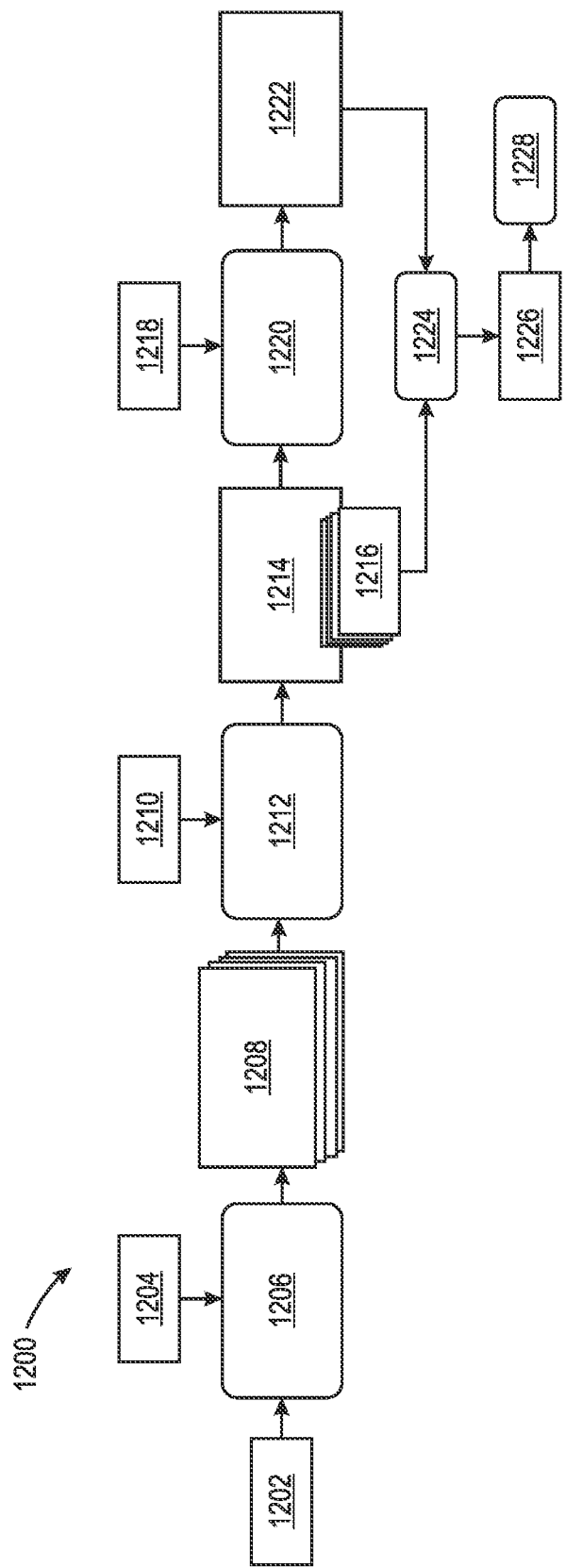
FIG. 12 illustrates a nonlimiting example method of the present disclosure for diagnosing a fault in a physical system using the single input test approach.

FIG. 12 illustrates a nonlimiting example method 1200 of the present disclosure for diagnosing a fault in a physical system using the single input test approach. A fault indicator may be identified in the physical system and data 1202 describing the state of the system may be gathered. The data 1202 may be applied to the surrogate model 1204 (e.g., surrogate model 118 of FIG. 1) to produce 1206 (or identify) potential fault modes 1208. The potential fault modes 1208 and a similarity metric 1210 (e.g., cosine similarity metric, L2 similarity metric, or a combination thereof) may undergo the optimization algorithms (e.g., the single input test, the multiple input test, or both) to produce 1212 an input 1214 to the system and corresponding outputs 1216 that may be used in differentiating between the potential fault modes 1208. The input 1214 may be applied 1220 to the physical system 1218 (which may be the actual physical system or a simulated physical system) to produce a physical system response 1222. The system response 1222 may be compared to the outputs 1216 corresponding to each of the inputs 1214 for each of the potential fault modes 1208 to identify 1224 a true mode 1226 (or most likely true mode) of the physical system. The true mode 1226 including the fault(s) therein may then be used for performing actions 1228, if needed, relative to the physical system to mitigate, if not eliminate, the fault.

Accordingly, a method of the present disclosure for diagnosing a fault in a physical system may include: identifying a fault indicator associated with the physical system; collecting first data related to a state of the physical system; applying a surrogate model to the first data to produce a plurality of potential fault modes; applying an optimization algorithm to the plurality of potential fault modes using a similarity metric to produce an input and a plurality of outputs, wherein each of the plurality of outputs corresponds to one of the plurality of potential fault modes, wherein the input provides differentiation between each of the plurality of outputs; applying the input to the physical system; collecting second data from physical system in response to applying the input; identifying a true mode of the physical system based on a comparison of the second data and the plurality of outputs; and diagnosing the fault of the physical system based on the true mode. After diagnosing the fault, one or more actions may be taken, for example, (i) displaying the fault for an operator to consider and provide, if needed, an action relative to the physical system to mitigate or eliminate the fault, (ii) changing an operating parameter of the physical system in response to the fault (e.g., bypassing a portion of the physical system in which the fault is located), (iii) applying a remedial action to the physical system in response to the fault (e.g., replacing a component that is faulty, compensating for the fault using operational parameters, and/or implementing a backup component in the physical system), and (iv) any combination of (i), (ii), and (iii).

Further, a computing system of the present disclosure for diagnosing a fault in a physical system may include: a processor; a memory coupled to the processor; and instructions provided to the memory, wherein the instructions are executable by the processor to cause the physical system to perform any of the foregoing methods.

Further, a computing system of the present disclosure for diagnosing a fault in a physical system may include: a set of processors, a computer-readable medium coupled to the set of processors having instructions stored thereon that, when executed by the set of processors, cause the set of processors to perform operations comprising: identifying a fault indicator associated with the physical system (or accepting as an input a fault indicator associated with the physical system); receiving first data related to a state of the physical system; applying a surrogate model to the first data to produce a plurality of potential fault modes; applying an optimization algorithm to the plurality of potential fault modes using a similarity metric to produce an input and a plurality of outputs, wherein each of the plurality of outputs corresponds to one of the plurality of potential fault modes, wherein the input provides differentiation between each of the plurality of outputs; causing the physical system to receive the input to the physical system (e.g., by causing the input to occur and/or by notifying an operator about the input who may approve the input for the processor to cause to occur or said operator may cause the input to occur); receiving second data from physical system in response to applying the input; identifying a true mode of the physical system based on a comparison of the second data and the plurality of outputs; and diagnosing the fault of the physical system based on the true mode. After diagnosing the fault, one or more actions may be taken as part of the operations performed by the processors (e.g., said actions may be part of the instructions for performing operations), for example, (i) displaying the fault for an operator to consider and provide, if needed, an action relative to the physical system to mitigate or eliminate the fault, (ii) causing an operating parameter of the physical system to change in response to the fault (e.g., bypassing a portion of the physical system in which the fault is located), (iii) causing a remedial action to the physical system to occur in response to the fault (e.g., replacing a component that is faulty, compensating for the fault using operational parameters, and/or implementing a backup component in the physical system), and (iv) any combination of (i), (ii), and (iii). In (ii) and (iii), the set of instructions may further include receiving an instruction (e.g., from an operator) to perform (ii) and/or (iii).

Figure 13:
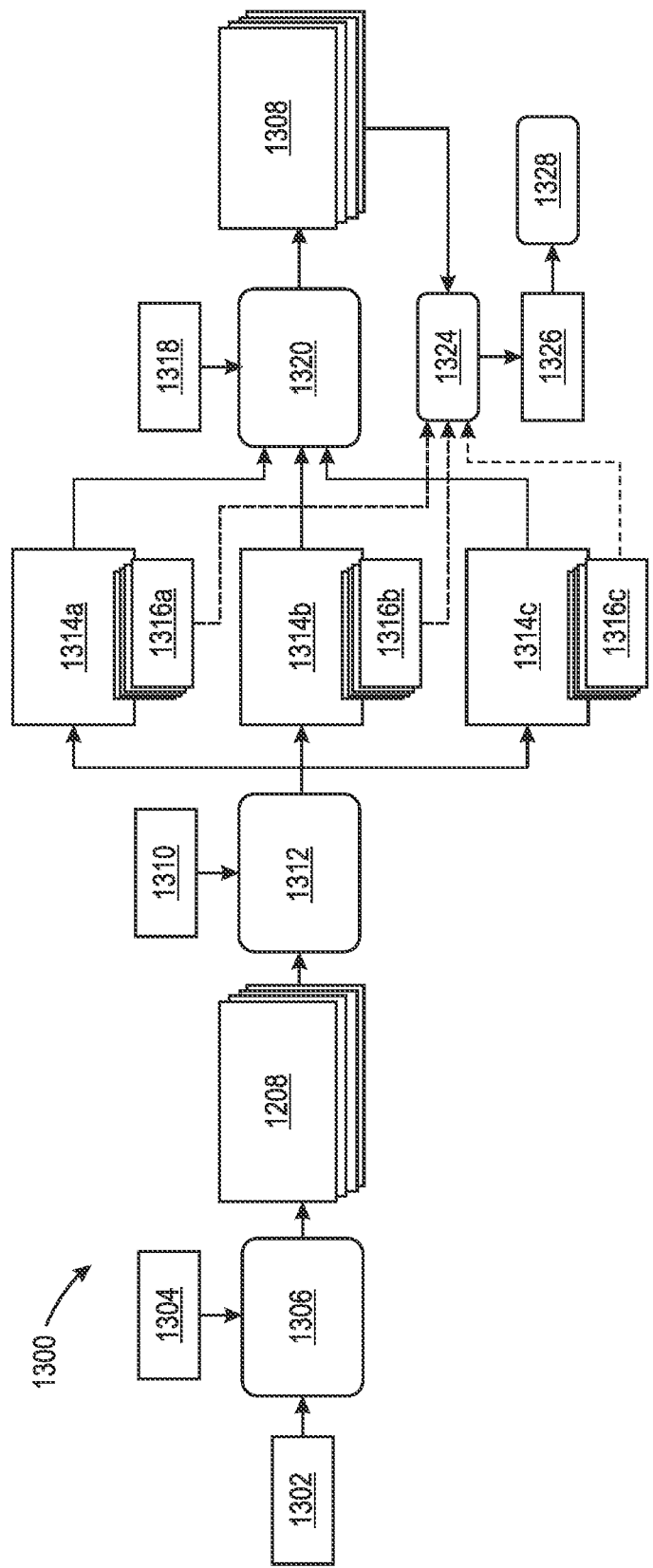
FIG. 13 illustrates a nonlimiting example method of the present disclosure for diagnosing a fault in a physical system using the multiple input test approach.

FIG. 13 illustrates a nonlimiting example method 1300 of the present disclosure for diagnosing a fault in a physical system using the multiple input test approach. A fault indicator may be identified in the physical system and data 1302 describing the state of the system may be gathered. The data 1302 may be applied to the surrogate model 1304 (e.g., surrogate model 118 of FIG. 1) to produce 1306 (or identify) potential fault modes 1308. The potential fault modes 1308 and a similarity metric 1310 (e.g., cosine similarity metric, L2 similarity metric, or a combination thereof) may undergo the optimization algorithms (e.g., the multiple input test, or both) to produce 1312 a plurality of inputs 1314a, 1314b, 1314c to the system and a plurality of outputs 1316a, 1316b, 1316c corresponding to each of plurality of inputs 1314a, 1314b, 1314c, which may be used in differentiating between the potential fault modes 1308. The plurality of inputs 1314a, 1314b, 1314c may be applied 1320 to the physical system 1318 (which may be the actual physical system or a simulated physical system) to produce a system response 1322 for each of the inputs 1314a, 1314b, 1314c. The system responses 1222 may be compared to the plurality of outputs 1316a, 1316b, 1316c corresponding to each of plurality of inputs 1314a, 1314b, 1314c for each of the potential fault modes 1308 to identify 1324 a true mode 1326 (or most likely true mode) of the physical system. The true mode 1326 including the fault(s) therein may then be used for performing actions 1328, if needed, relative to the physical system to mitigate, if not eliminate, the fault.

Accordingly, a method of the present disclosure for diagnosing a fault in a physical system may include: identifying a fault indicator associated with the physical system; collecting first data related to a state of the physical system; applying a surrogate model to the first data to produce a plurality of potential fault modes; applying an optimization algorithm to the plurality of potential fault modes using a similarity metric to produce a plurality of inputs and a plurality of outputs for each of the plurality of inputs, wherein each of the plurality of outputs for each of the plurality of inputs corresponds to one of the plurality of potential fault modes, wherein at least two of the plurality of inputs produce a different output for one of the plurality of potential fault modes; applying the plurality of inputs to the physical system; collecting second data from physical system in response to applying the plurality of inputs; identifying a true mode of the physical system based on a comparison of the second data and the plurality of outputs for each of the plurality of inputs; and diagnosing the fault of the physical system based on the true mode. After diagnosing the fault, one or more actions may be taken, for example, (i) displaying the fault for an operator to consider and provide, if needed, an action relative to the physical system to mitigate or eliminate the fault, (ii) changing an operating parameter of the physical system in response to the fault (e.g., bypassing a portion of the physical system in which the fault is located), (iii) applying a remedial action to the physical system in response to the fault (e.g., replacing a component that is faulty, compensating for the fault using operational parameters, and/or implementing a backup component in the physical system), and (iv) any combination of (i), (ii), and (iii).

Further, a computing system of the present disclosure for diagnosing a fault in a physical system may include: a processor; a memory coupled to the processor; and instructions provided to the memory, wherein the instructions are executable by the processor to cause the physical system to perform any of the foregoing methods.

Further, a computing system of the present disclosure for diagnosing a fault in a physical system may include: a set of processors, a computer-readable medium coupled to the set of processors having instructions stored thereon that, when executed by the set of processors, cause the set of processors to perform operations comprising: identifying a fault indicator associated with the physical system (or accepting as an input a fault indicator associated with the physical system); receiving first data related to a state of the physical system; applying a surrogate model to the first data to produce a plurality of potential fault modes; applying an optimization algorithm to the plurality of potential fault modes using a similarity metric to produce a plurality of inputs and a plurality of outputs for each of the plurality of inputs, wherein each of the plurality of outputs for each of the plurality of inputs corresponds to one of the plurality of potential fault modes, wherein at least two of the plurality of inputs produce a different output for one of the plurality of potential fault modes; causing the physical system to receive the plurality of inputs to the physical system (e.g., by causing the plurality of inputs to occur and/or by notifying an operator about the plurality of inputs who may approve the plurality of inputs for the processor to cause to occur or said operator may cause the plurality of inputs to occur); receiving second data from physical system in response to applying the plurality of inputs; identifying a true mode of the physical system based on a comparison of the second data and the plurality of outputs for each of the plurality of inputs; and diagnosing the fault of the physical system based on the true mode. After diagnosing the fault, one or more actions may be taken as part of the operations performed by the processors (e.g., said actions may be part of the instructions for performing operations), for example, (i) displaying the fault for an operator to consider and provide, if needed, an action relative to the physical system to mitigate or eliminate the fault, (ii) causing an operating parameter of the physical system to change in response to the fault (e.g., bypassing a portion of the physical system in which the fault is located), (iii) causing a remedial action to the physical system to occur in response to the fault (e.g., replacing a component that is faulty, compensating for the fault using operational parameters, and/or implementing a backup component in the physical system), and (iv) any combination of (i), (ii), and (iii). In (ii) and (iii), the set of instructions may further include receiving an instruction (e.g., from an operator) to perform (ii) and/or (iii).

Example Embodiments

Clause 1. A method for diagnosing a fault in a physical system, the method comprising: identifying a fault indicator associated with the physical system; collecting first data related to a state of the physical system; applying a surrogate model to the first data to produce a plurality of potential fault modes; applying an optimization algorithm to the plurality of potential fault modes using a similarity metric to produce an input and a plurality of outputs, wherein each of the plurality of outputs corresponds to one of the plurality of potential fault modes, wherein the input provides differentiation between each of the plurality of outputs; applying the input to the physical system; collecting second data from physical system in response to applying the input; identifying a true mode of the physical system based on a comparison of the second data and the plurality of outputs; and diagnosing the fault of the physical system based on the true mode.

Clause 2. The method of Clause 1, wherein the method is performed in real-time.

Clause 3. The method of any one of Clauses 1-2 further comprising: changing an operating parameter of the system in response to the fault.

Clause 4. The method of any one of Clauses 1-3 further comprising: applying a remedial action to the system in response to the fault.

Clause 5. The method of any one of Clauses 1-4 further comprising: displaying the fault.

Clause 6. The method of any one of Clauses 1-5, wherein the optimization algorithm is a gradient-free optimization algorithm.

Clause 7. The method of any one of Clauses 1-6, wherein the surrogate model is a neural network trained based on third data produced by an augmented system model that is a physics-based model capable of modeling nominal modes and faulty modes of the physical system.

Clause 8. The method of Clause 7, wherein the neural network is a recurrent neural network.

Clause 9. The method of any one of Clauses 1-8, wherein the physical system comprises a mechanical system, an electrical system, and/or a thermal system.

Clause 10. The method of any one of Clauses 1-9, wherein the physical system comprises at least one of: like a pendulum swinging, a simple circuit, an electrical circuit, an internal combustion engine, an engine other than an internal combustion engine, a chemical reactor, a polymer synthesis reactor, a ventricular assist device, a power plant, a wind turbine, and the like.

Clause 11. The method of any one of Clauses 1-10, wherein the similarity metric comprises a cosine similarity metric and/or a L2 similarity metric.

Clause 12. A computing system for diagnosing a fault in a physical system, the computing system comprising: a processor; a memory coupled to the processor; and instructions provided to the memory, wherein the instructions are executable by the processor to cause the system to perform the method of any one of Clauses 1-11.

Clause 13. A method for diagnosing a fault in a system, the method comprising: identifying a fault indicator associated with the physical system; collecting first data related to a state of the physical system; applying a surrogate model to the first data to produce a plurality of potential fault modes; applying an optimization algorithm to the plurality of potential fault modes using a similarity metric to produce a plurality of inputs and a plurality of outputs for each of the plurality of inputs, wherein each of the plurality of outputs for each of the plurality of inputs corresponds to one of the plurality of potential fault modes, wherein at least two of the plurality of inputs produce a different output for one of the plurality of potential fault modes; applying the plurality of inputs to the physical system; collecting second data from physical system in response to applying the plurality of inputs; identifying a true mode of the physical system based on a comparison of the second data and the plurality of outputs for each of the plurality of inputs; and diagnosing the fault of the physical system based on the true mode.

Clause 14. The method of Clause 13 further comprising: changing an operating parameter of the system in response to the fault.

Clause 15. The method of any one of Clauses 13-14 further comprising: applying a remedial action to the system in response to the fault.

Clause 16. The method of any one of Clauses 13-15 further comprising: displaying the fault.

Clause 17. The method of any one of Clauses 13-16, wherein the optimization algorithm is a gradient-free optimization algorithm.

Clause 18. The method of any one of Clauses 13-17, wherein the surrogate model is a neural network trained based on third data produced by an augmented system model that is a physics-based model capable of modeling nominal modes and faulty modes of the physical system.

Clause 19. The method of Clause 18, wherein the neural network is a recurrent neural network.

Clause 20. The method of any one of Clauses 13-19, wherein the physical system comprises a mechanical system, an electrical system, and/or a thermal system.

Clause 21. The method of any one of Clauses 13-20, wherein the physical system comprises at least one of: like a pendulum swinging, a simple circuit, an electrical circuit, an internal combustion engine, an engine other than an internal combustion engine, a chemical reactor, a polymer synthesis reactor, a ventricular assist device, a power plant, a wind turbine, and the like.

Clause 22. A system comprising: a processor; a memory coupled to the processor; and instructions provided to the memory, wherein the instructions are executable by the processor to cause the system to perform the method of any one of Clauses 13-21.

Clause 23. A method for generating a surrogate model, the method comprising: applying a fault augmentation to a physics-based model of a physical system using physics-based fault modes to yield an augmented system model; generating training data by applying a plurality of inputs to the augmented system model; and training the surrogate model comprising differential equations with the training data.

Clause 24. The method of Clause 23 further comprising: generating the plurality of inputs.

Clause 25. The method of any one of Clauses 23-24, wherein the generating of the plurality of inputs comprise: randomly selecting input data points within a defined matrix of potential inputs.

Clause 26. The method of any one of Clauses 23-25, wherein the physical system is a simulated physical system.

Clause 27. The method of any one of Clauses 23-26, wherein the physical system comprises at least one of: like a pendulum swinging, a simple circuit, an electrical circuit, an internal combustion engine, an engine other than an internal combustion engine, a chemical reactor, a polymer synthesis reactor, a ventricular assist device, a power plant, a wind turbine, and the like.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method for diagnosing a fault in a physical system, the method comprising:
   identifying a fault indicator associated with the physical system;
   collecting first data related to a state of the physical system;
   applying a surrogate model to the first data to produce a plurality of potential fault modes, wherein the surrogate model is a recurrent neural network (RNN) trained by:
      inputting a training data set, the training data set generated from an augmented system model and a first set of one or more separate training modes generated by the RNN;
      comparing, to the training data set, a second set of one or more separate training modes, the second set of one or more separate training modes generated by the RNN based on the training data set; and
      based on the comparing, adjusting one or more weights of the RNN;
   applying an optimization algorithm to the plurality of potential fault modes using a similarity metric to produce an input and a plurality of outputs, wherein each of the plurality of outputs corresponds to one of the plurality of potential fault modes, wherein the input provides differentiation between each of the plurality of outputs; applying the input to the physical system;
   collecting second data from physical system in response to applying the input;
   identifying a true mode of the physical system based on a comparison of the second data and the plurality of outputs; and
   diagnosing the fault of the physical system based on the true mode.

2. The method of claim 1, wherein the method is performed in real-time.

3. The method of claim 1 further comprising:
   changing an operating parameter of the system in response to the fault.

4. The method of claim 1 further comprising:
   applying a remedial action to the system in response to the fault.

5. The method of claim 1 further comprising:
   displaying the fault.

6. The method of claim 1, wherein the optimization algorithm is a gradient-free optimization algorithm.

7. The method of claim 1, wherein the surrogate model is a neural network trained based on third data produced by the augmented system model that is a physics-based model capable of modeling nominal modes and faulty modes of the physical system.

8. The method of claim 1, wherein the physical system comprises a mechanical system, an electrical system, and/or a thermal system.

9. The method of claim 1, wherein the similarity metric comprises a cosine similarity metric and/or an L2 similarity metric.

10. A computing system for diagnosing a fault in a physical system, the computing system comprising:
    a processor;
    a memory coupled to the processor; and
    instructions provided to the memory, wherein the instructions are executable by the processor to cause the system to perform the method of claim 1.

11. A method for diagnosing a fault in a system, the method comprising:
    identifying a fault indicator associated with the physical system;
    collecting first data related to a state of the physical system;
    applying a surrogate model to the first data to produce a plurality of potential fault modes, wherein the surrogate model is a recurrent neural network (RNN) trained by:
       inputting a training data set, the training data set generated from an augmented system model and a first set of one or more separate training modes generated by the RNN;
       comparing, to the training data set, a second set of one or more separate training modes, the second set of one or more separate training modes generated by the RNN based on the training data set; and
       based on the comparing, adjusting one or more weights of the RNN;
    applying an optimization algorithm to the plurality of potential fault modes using a similarity metric to produce a plurality of inputs and a plurality of outputs for each of the plurality of inputs, wherein each of the plurality of outputs for each of the plurality of inputs corresponds to one of the plurality of potential fault modes, wherein at least two of the plurality of inputs produce a different output for one of the plurality of potential fault modes;
    applying the plurality of inputs to the physical system;
    collecting second data from physical system in response to applying the plurality of inputs;
    identifying a true mode of the physical system based on a comparison of the second data and the plurality of outputs for each of the plurality of inputs; and diagnosing the fault of the physical system based on the true mode.

12. The method of claim 11 further comprising:
    changing an operating parameter of the system in response to the fault.

13. The method of claim 11 further comprising:
    applying a remedial action to the system in response to the fault.

14. The method of claim 11 further comprising:
    displaying the fault.

15. The method of claim 11, wherein the optimization algorithm is a gradient-free optimization algorithm.

16. The method of claim 11, wherein the surrogate model is a neural network trained based on third data produced by the augmented system model that is a physics-based model capable of modeling nominal modes and faulty modes of the physical system.

17. A system comprising:
    a processor;
    a memory coupled to the processor; and
    instructions provided to the memory, wherein the instructions are executable by the processor to cause the system to perform the method of claim 11.

18. A method for generating a surrogate model, the method comprising:
    applying a fault augmentation to a physics-based model of a physical system using physics-based fault modes to yield an augmented system model;
    generating training data by applying a plurality of inputs to the augmented system model, the inputs including a first set of one or more separate training modes generated by a recurrent neural network (RNN); and
    training the surrogate model comprising differential equations with the training data, wherein the surrogate model is the RNN trained by:

inputting the training data;
comparing, to the training data, a second set of one or more separate training modes, the second set of one or more separate training modes generated by the RNN based on the training data; and
based on the comparing, adjusting one or more weights of the RNN.

* * * * *